(12) United States Patent
Gupta et al.

(10) Patent No.: US 8,166,454 B2
(45) Date of Patent: Apr. 24, 2012

(54) OBJECT ORIENTED BASED METHODOLOGY FOR MODELING BUSINESS FUNCTIONALITY FOR ENABLING IMPLEMENTATION IN A WEB BASED ENVIRONMENT

(75) Inventors: Arun K. Gupta, Easton, CT (US); Rajiv K. Uppal, Trumbull, CT (US); Devang I. Patrikh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/178,875

(22) Filed: Jul. 24, 2008

(65) Prior Publication Data

US 2009/0037874 A1 Feb. 5, 2009

Related U.S. Application Data

(60) Division of application No. 10/951,262, filed on Sep. 27, 2004, now Pat. No. 7,533,366, which is a continuation of application No. 09/631,318, filed on Aug. 3, 2000, now Pat. No. 6,898,783.

(51) Int. Cl.
G06F 9/45 (2006.01)
(52) U.S. Cl. ...................................... 717/105
(58) Field of Classification Search ................... 717/105
See application file for complete search history.

(56) References Cited

U.S. PATENT DOCUMENTS

| | | | |
|---|---|---|---|
| 4,367,525 A | 1/1983 | Brown et al. |
| 4,542,458 A | 9/1985 | Kitajina et al. |
| 4,658,370 A | 4/1987 | Erman et al. |
| 4,665,478 A | 5/1987 | Hirose et al. |
| 5,257,371 A | 10/1993 | Anezaki |
| 5,265,250 A | 11/1993 | Andrade et al. |
| 5,305,389 A | 4/1994 | Palmer |
| 5,327,559 A | 7/1994 | Priven et al. |
| 5,485,610 A | 1/1996 | Gioielli et al. |
| 5,584,035 A | 12/1996 | Duggan et al. |
| 5,644,770 A | 7/1997 | Burke et al. |
| 5,655,150 A | 8/1997 | Matsumoto et al. |
| 5,675,739 A | 10/1997 | Eilert et al. |
| 5,680,617 A | 10/1997 | Gough et al. |
| 5,692,215 A | 11/1997 | Kutzik et al. |
| 5,694,601 A | 12/1997 | White |
| 5,706,505 A | 1/1998 | Fraley et al. |
| 5,710,920 A | 1/1998 | Maruyama et al. |
| 5,721,900 A | 2/1998 | Banning et al. |
| 5,721,901 A | 2/1998 | Banning et al. |
| 5,721,912 A | 2/1998 | Stepczyk et al. |
| 5,724,556 A | 3/1998 | Souder et al. |
| 5,732,257 A | 3/1998 | Atkinson et al. |
| 5,751,909 A | 5/1998 | Gower |
| 5,758,349 A | 5/1998 | Breslau et al. |
| 5,764,958 A | 6/1998 | Coskun |

(Continued)

OTHER PUBLICATIONS

James Martin, "Principles of Object Oriented Analysis and Design", Chapters 1-22, published Jun. 1, 1992.

(Continued)

*Primary Examiner* — John Chavis
(74) *Attorney, Agent, or Firm* — Arthur J. Samodovitz

(57) ABSTRACT

A computer method and apparatus defining Business Classes for modeling business activities comprising the steps of representing business activities as the interaction between one or more Business Classes, and entering into a computer and storing in an electronic format the Business Classes and the relationships existing between the Business Classes.

27 Claims, 15 Drawing Sheets

U.S. PATENT DOCUMENTS

| | | | |
|---|---|---|---|
| 5,809,266 A | 9/1998 | Touma et al. |
| 5,835,758 A | 11/1998 | Nochur et al. |
| 5,842,213 A | 11/1998 | Odom et al. |
| 5,848,145 A | 12/1998 | Gallagher et al. |
| 5,850,548 A | 12/1998 | Williams |
| 5,850,631 A | 12/1998 | Golshani et al. |
| 5,862,379 A | 1/1999 | Rubin et al. |
| 5,864,862 A | 1/1999 | Kriens et al. |
| 5,872,969 A | 2/1999 | Copeland et al. |
| 5,872,971 A | 2/1999 | Knapman et al. |
| 5,884,081 A | 3/1999 | Burbeck |
| 5,892,917 A | 4/1999 | Myerson |
| 5,893,105 A | 4/1999 | MacLennan |
| 5,901,319 A | 5/1999 | Hirst |
| 5,903,897 A | 5/1999 | Carrier, III et al. |
| 5,907,847 A | 5/1999 | Goldberg |
| 5,911,075 A | 6/1999 | Glaser et al. |
| 5,913,061 A | 6/1999 | Gupta et al. |
| 5,915,253 A | 6/1999 | Christiansen |
| 5,920,718 A | 7/1999 | Uczekaj et al. |
| 5,924,109 A | 7/1999 | Ackerman et al. |
| 5,930,512 A | 7/1999 | Boden et al. |
| 5,946,682 A | 8/1999 | Wolfe |
| 5,946,694 A | 8/1999 | Copeland et al. |
| 5,953,524 A | 9/1999 | Meng et al. |
| 5,956,506 A | 9/1999 | Cobb et al. |
| 5,960,200 A | 9/1999 | Eager et al. |
| 5,960,420 A | 9/1999 | Leymann et al. |
| 5,964,828 A | 10/1999 | Cummins |
| 5,966,535 A | 10/1999 | Benedikt et al. |
| 5,970,498 A | 10/1999 | Duffield et al. |
| 5,974,443 A | 10/1999 | Jeske |
| 5,987,242 A | 11/1999 | Bentley et al. |
| 5,991,535 A | 11/1999 | Fowlow et al. |
| 6,003,037 A | 12/1999 | Kassabgi et al. |
| 6,009,405 A | 12/1999 | Leymann et al. |
| 6,014,637 A | 1/2000 | Fell et al. |
| 6,023,578 A | 2/2000 | Birsan et al. |
| 6,023,702 A | 2/2000 | Leisten et al. |
| 6,028,997 A | 2/2000 | Leymann et al. |
| 6,029,207 A | 2/2000 | Heninger |
| 6,038,538 A | 3/2000 | Agrawal et al. |
| 6,063,128 A | 5/2000 | Bentley et al. |
| 6,073,111 A | 6/2000 | Leymann et al. |
| 6,074,431 A | 6/2000 | Watanabe et al. |
| 6,122,633 A | 9/2000 | Leymann et al. |
| 6,129,274 A | 10/2000 | Suzuki |
| 6,158,044 A | 12/2000 | Tibbetts |
| 6,167,564 A | 12/2000 | Fontana et al. |
| 6,208,345 B1 | 3/2001 | Sheard et al. |
| 6,275,863 B1 | 8/2001 | Leff et al. |
| 6,278,977 B1 | 8/2001 | Agrawal et al. |
| 6,279,009 B1 | 8/2001 | Smirnov et al. |
| 6,308,224 B1 | 10/2001 | Leymann et al. |
| 6,336,118 B1 | 1/2002 | Hammond |
| 6,385,769 B1 | 5/2002 | Lewallen |
| 6,415,297 B1 | 7/2002 | Leymann et al. |
| 6,473,748 B1 | 10/2002 | Archer |
| 6,477,527 B2 | 11/2002 | Carey et al. |
| 6,567,807 B1 | 5/2003 | Robles et al. |
| 6,625,803 B1 | 9/2003 | Massena et al. |
| 6,732,353 B1 | 5/2004 | Bloom et al. |
| 6,738,901 B1 | 5/2004 | Boyles et al. |
| 6,898,783 B1 | 5/2005 | Gupta et al. |
| 7,017,142 B1 | 3/2006 | Ehnebuske et al. |
| 7,409,671 B1 | 8/2008 | Meredith et al. |
| 7,533,366 B2 | 5/2009 | Gupta et al. |
| 2002/0023261 A1 | 2/2002 | Goodwin et al. |
| 2002/0055849 A1 | 5/2002 | Georgakopoulos et al. |
| 2002/0092004 A1 | 7/2002 | Lee et al. |
| 2003/0229695 A1 | 12/2003 | McBride |
| 2005/0060684 A1 | 3/2005 | Gupta et al. |
| 2005/0234902 A1 | 10/2005 | Meredith et al. |
| 2006/0255124 A1 | 11/2006 | Hoch et al. |
| 2009/0024949 A1* | 1/2009 | Gupta et al. ................. 715/771 |
| 2009/0037502 A1 | 2/2009 | Gupta et al. |
| 2009/0037874 A1 | 2/2009 | Gupta et al. |

OTHER PUBLICATIONS

Template Software Inc., "Developing a WFT Workflow System", WFT Version 8.0, Chapters 1-10, released 1997.

F. Leymann et al., "Workflow-based Applications", IBM Systems Journal, vol. 36, No. 1, pp. 102-123, 1997.

D. W. Mc David, "Business Language Analysis for Object-Oriented Information Systems", IBM Systems Journal, vol. 35, No. 2, 1996, pp. 128-150.

R. L. Katz, "Business / Enterprise Modeling", IBM Systems Journal, vol. 29, No. 4, 1990, pp. 509-525.

A. A. R. Cockburn, "The Impact of Object-Orientation on Application Development", IBM Systems Journal, vol. 32, No. 3, 1993, pp. 420-444.

K. D. Saracelli et al., "Process Automation in Software Application Development", IBM Systems Journal, vol. 32, No. 3, 1993, pp. 376-396.

R. P. Ten Dyke et al., "Object-oriented Programming", IBM Systems Journal, vol. 28, No. 3, 1989, pp. 465-478.

Rational Software Corporation, "Using Rational Rose 4.0", Chapters 1-13, Released Nov. 1996.

Rational Software Corporation, "Rational Rose/C++ Round-Trip Engineering with Rational Rose/C++", pp. 1-227, Released 1996.

Agarwal, R. et al. "An Operational Approach to the Design of Workflow Systems", Elsevier, Information and Software Technology 42 (2000), pp. 547-555.

IBM MQSeries Workflow Concepts and Architecture version 3.2, IBM, published Jun. 1999, pp. 16-17.

IBM FlowMark Modeling version 2, Release 3, IBM, published Dec. 1996, pp. 2-28, 47-57, 67-74, 152-155.

"Using the WFT Development Environment, Template Software", Template Software Inc., Jun. 1998.

"Template Software Strengthens Core Product Family with Ease-of-Use and Functionality Enhancement that Promotes Unparalleled Software Reuse", PR Newswire, Jun. 23, 1997.

"Template Software Rolls Out Corporate and Product Growth Strategies at Solutions '97", Template Software Inc., PR Newswire, Apr. 3, 1997.

Jacobson, Ivar,"Object-Orient Software Engineering", pp. 126-129, 156-163, Jan. 1996.

Leymann et al., "Managing business processes as an information resource", IBM Systems Journal, vol. 33, No. 2. 1994.

Levy, Michael "ASP and Web Session Management" Microsoft Technical Paper, Apr. 2, 1997.

* cited by examiner

5. Associate the data controls with the attributes

OBJECT ORIENTED BASED METHODOLOGY FOR MODELING BUSINESS FUNCTIONALITY FOR ENABLING IMPLEMENTATION IN A WEB BASED ENVIRONMENT

RELATED APPLICATIONS

This application is a divisional of U.S. application Ser. No. 10/951,262 which was filed on Sep. 27, 2004 and which is a continuation of U.S. application Ser. No. 09/631,318, filed Aug. 3, 2000, now U.S. Pat. No. 6,898,783.

BACKGROUND OF THE INVENTION (1) Field of the Invention

This invention relates to a method for defining business functionality in an electronic form, and more particularly relates to an object oriented based methodology for modeling business functionality so as to generate hardware and software specific code therefrom for implementation in a web based computing environment.

(2) Description of the Related Art

Current computer programming techniques include the use of Object-Oriented Programming ("OOP"). OOP is characterized by a reliance on reusable, self-contained, callable program code modules known in the art as 'objects'. An object is a run-time instance of an object class. Specifically, the object class forms the definitional structure of the object. During execution, data storage space is allocated for each object where the space required is defined by the object class. This process of run time allocation is referred to as instantiation. As such, the object class acts as a template that defines the behavior of a group of similar objects. An object, instantiated from its corresponding object class, contains all of the attributes, methods, and messaging capabilities required to form tasks logically required by an application.

Each object is designed to accomplish a predefined set of operations through 'methods' and associated data. Associated data most often take the form of static variable definitions for storing attribute data associated with an object. Attribute data may record the relationship between the object and one or more other objects. Methods comprise programmed tasks for the object to perform when invoked. A method invocation usually occurs as a result of a message sent to an object by another object. The message identifies the method, or operation, that is to be performed. In addition, an object's methods may call upon methods included within the object's own definition.

OOP is a modular approach to programming wherein functionality is grouped by object class and implemented through the instantiation of objects. Such a modular approach makes software development more efficient and reliable through the use and reuse of individual, tested objects. Once coded and tested, object classes may be ported to other applications and compiled. One example of OOP computer languages include the C++ language developed by the AT&T Bell Laboratories of Murray Hills, N.J. as an extension of the non-OOP C programming language.

While an object's attribute value can indicate a logical state of the object and an object's methods contain the universe of functions which may be invoked pursuant to the operation of the object, to the best of the Applicant's knowledge there exists nothing in the structure of existing OOP objects for binding an object's state attribute variables to its methods. In addition, as presently conducted, methods which function as rules for evaluating or changing the value of an attribute are defined at the object class level and, as such, are not tied to individual instances of the class. An example of a limitation with the present state of the art is that while an object class may specify a method to compute a discounted price in general, it cannot specify a different rule for computing the discount price if the instance of the object class corresponds to a particular store chain.

The lack of a methodology by which OOP can bind, within the structure of an object, an object's state to its methods is a drawback in the art. A primary shortcoming of the present art arises from the proliferation of internet based applications. As used herein, "internet" refers to the global network of computers constantly connected to each other using standardized communications protocols, specifically TCP/IP. The internet is referred to as a "stateless" environment. That is, each client request sent from web browsers to application servers constitutes a singular communication session between client and server. As a result, communications are perceived by the server to be unique events and not part of a continuous dialogue. For example, a user interacting through a web browser to order a book over the internet may be guided through several windows to enter book selections and credit card information. Upon submitting each web page, the information entered by the user is submitted to the web server. However, the server does not automatically know if this is the first communication with the user, one of a series of interactions required to accomplish a task, or which communication in the series is presently being executed. To address this problem, there have been developed various methodologies to allow web servers to ascertain the context, or state, of the client request.

One methodology as disclosed in Microsoft technical paper entitled "ASP and Web Session Management" by Michael P. Levy, Apr. 2, 1997, involves the assignment of a unique session identifier to a client upon login. This identifier is passed back and forth in what is commonly called a cookie. Cookies are discreet packets of information appended to client and server communications that are stored and sent back and forth.

Once the unique identifier is received, the server can query a centralized database to ascertain where the client is in the context of completing the transaction. Because many servers may store and retrieve data from a centralized database, or from a plurality of databases, the potential for data bottlenecks to arise increases with the number of client sessions. In addition, processing power is required to ascertain state information in this manner which could be better utilized.

As business applications become more dependent upon internet based architectures, the need to redevelop and distribute architecture components becomes more important as well. Traditional computer architecture design is characterized by development of code to run on predefined hardware platforms using predefined software running on a predefined operating system. Unfortunately, the long life cycles involved in developing and testing code are not compatible with the rapid rate at which differing hardware and software platforms come into and out of existence, and the dynamic nature of the business models which are presently being implemented, in particular for use on the internet.

OOP allows for the creation and utilization of object classes to perform the needs of business. However, when coded in an existing language, such as C++, these object classes are constrained in their ability to run on multiple platforms. In addition, it is resource intensive to make even the most minor change to existing code that is distributed across many platforms. As a result, it is presently necessary to spend a great deal of time defining the precise nature of business functionality prior to beginning the coding of an application. Reasons for this include the requirement to thoroughly test the interaction of tens of thousands of lines of codes which will be distributed across many platforms. Even the smallest change in any one component of any platform can have large, and often times unintended, effects on other components. However, because the life cycle of many projects devoted to creating computer applications to implement business functionality is several years in duration, the needs of the business upon delivery of the completed application often differ greatly from the original design specifications.

Unfortunately, there presently exists a very strong relationship between the high level business functionality to be implemented in computer code and the low level architected system created to perform such functionality. As a result, changes to the high level business model necessitate complex and costly revisions to the code. The availability of new hardware and software platforms not present at the outset of a project is virtually impossible to integrate midstream in the development process.

What is therefore needed, is a method for designing architected computer systems for carrying out business functionality that does not suffer from the limitations of the prior art.

SUMMARY OF THE INVENTION

The present invention provides a methodology which allows for the intuitive translation of business processes into a computer defined structure. Such a methodology allows for high level definition of the interaction of business units in a manner which is visually understandable, easy to edit, and from which computer code can be generated. In addition, the present invention discloses a method by which business units are represented as carrying with them the complete state diagrams necessary to fully define their states and the methods or functions required to be performed to carry the business unit to the next logical state. Such a representation allows for communication in the stateless internet environment in a manner which maintains the context and state of data objects and thus overcomes the bottlenecks necessitated by the prior art. Such a methodology permits the rapid design of computer systems to carry out business functions, allows for editing and code regeneration during development to respond to changing business needs and severs the business needs of the company from the platforms upon which the completed code is to be implemented. In addition, utility is derived from a methodology of defining business classes which binds business rules or methods to individual instances of the business class.

Accordingly, it is an object of the present invention to provide a method for translating the interactions and operations of a business enterprise into a computer based structure which captures and defines its real world counterpart. The present invention therefore provides a methodology to define and model discreet business entities that when combined comprise a business. Through the inclusion of an intuitive graphical user interface (GUI), the process of defining the attributes of business entities, the relationships between business entities, and the methods and state pertaining to each business entity is enabled. In addition, the definition of messages and output display formats required by business entities are likewise enabled.

An additional aspect of the present invention is a methodology for defining and editing business entity information in the form of business class definitions While existing class definitions, as expressed in myriad object oriented programming languages are known, for example in C++, the class definitions of the present invention provide previously unavailable capabilities. A feature of the invention is that the class definitions permit the encoding of complete state diagrams for each business class. The resultant business classes contain all of the information necessary to automate, in a computer environment, the real world functionality of the entity modeled by the business class.

The present invention provides a methodology for defining business classes comprised of business methods, business attributes, business rules, messages, and web pages. Business rules are comprised of logical code tied to one or more business attributes. It is one advantage of the present invention that the methodology for defining business rules allows one to define individual business rules tied to a particular instance, or instantiation, of the more generalized business class. As a result, the operation of two business objects, instantiated from the same business class, can exhibit differing behavior based upon the unique identity of each.

Yet another aspect of the present invention is the methodology by which an interface between the user and the defined business class is provided and maintained. Specifically, an intuitive GUI is provided through which a system designer may depict the function of business entities and their attendant relationships. As a result of this visually comprehensible diagram, the present invention allows for the automated generation of many of each business class' business attributes, business methods, and business rules required to implement the relationships thusly defined. In addition, each business entity graphically displayed and diagrammed as so described can be selected so as to render increasingly more detailed representations of the business class's structure. There is provided an intuitive method for switching back and forth between the most abstracted views of business classes and business methods, and the lowest level definitions of their attendant structure.

Accordingly, one aspect of the present invention is drawn to a method of defining Business Classes for modeling a business activity comprising the steps of representing the business activity as an interaction between one or more Business Classes, storing in a digital electronic format the one or more Business Classes as well as the relationships existing between the one or more Business Classes, and providing a GUI whereby desired ones of the Business Classes and of the relationships may be linked to thereby generate computer code.

Yet another aspect of the present invention is drawn to the aforementioned method wherein entering into a computer the Business Classes comprises the steps of entering Business Attributes related to each of the one or more Business Classes, defining Business Processes related to each of the one or more Business Classes, and entering Business Rules associated with one or more Business Attributes.

Yet another aspect of the present invention is drawn to the aforementioned method wherein defining Business Processes comprises the additional steps of defining one or more Business States indicative of the status of a Business Class, and defining one or more Business Methods to logically define the steps required to move a Business Class between one or more Business States.

Yet another aspect of the present invention is drawn to the aforementioned method wherein entering the Business Classes comprises the additional step of defining messages whereby each of the Business Classes may interact with each of the other Business Classes or code external to each of the other Business Classes.

Still another aspect of the present invention is drawn to the aforementioned method wherein entering the Business Classes comprises the additional step of defining one or more web pages associated with each of the one or more Business Classes.

Yet another aspect of the present invention is drawn to the aforementioned method wherein entering into a computer the Business Classes comprises the additional step of diagramming the relationship between a plurality of Business Classes using a graphical user interface (GUI).

Still another aspect of the present invention is drawn to the aforementioned method wherein diagramming the relationships between the plurality of Business Classes comprises the steps of selecting an icon from an object palette to represent one of the plurality of Business Classes, dragging and dumping the icon upon a user desktop in a desired location, repeating the previous steps, and defining the relationships between each of the plurality of Business Classes represented by the icons.

Yet another aspect of the present invention is drawn to the aforementioned method wherein defining the relationships between each of the plurality of Business Classes represented by the icons comprises the additional steps of selecting a first one of the icons, selecting a second one of the icons; and specifying the nature of the relationship between the first and the second icons.

Yet another aspect of the present invention is drawn to the aforementioned method wherein specifying the nature of the relationship between the first and the second icons comprises the additional step of selecting an icon from a relationship palette.

Yet another aspect of the present invention is drawn to the aforementioned method wherein defining Business Processes related to each of the one or more Business Classes comprises the additional step of diagramming Business States and Business Methods.

Yet another aspect of the present invention is drawn to the aforementioned method wherein defining one or more of the Business States and Business Methods is performed through a GUI.

Yet another aspect of the present invention is drawn to the aforementioned method wherein defining one or more of the Business States and Business Methods comprises the additional steps of selecting a business state icon from an object palette, dragging and dropping one or more of the business state icons upon a user desktop, selecting a business method icon from an object palette, and dragging and dropping one or more of the business method icons between two of the business state icons.

Still another aspect of the present invention is drawn to the aforementioned method wherein the Business Classes are stored in a repository.

Yet another aspect of the present invention is drawn to the aforementioned wherein each Business Attribute is selected from the set consisting in part of R, M, S, B, and E.

Yet another aspect of the present invention is drawn to the aforementioned method wherein a first subset of information defining the Business Classes is accessed in a text based format.

Yet another aspect of the present invention is drawn to the aforementioned method wherein a second subset of information defining the Business Classes is accessed in a GUI format.

Yet another aspect of the present invention is drawn to the aforementioned method wherein Business Attributes are automatically generated and stored in a repository.

Yet another aspect of the present invention is drawn to the aforementioned method wherein Business methods are automatically generated and stored in a repository.

The details of one or more embodiments of the invention are set forth in the accompanying drawings and the description below. Other features, objects, and advantages of the invention will be apparent from the description and drawings that follow.

BRIEF DESCRIPTION OF THE DRAWINGS

Like reference numbers and designations in the various drawings indicate like elements.

DETAILED DESCRIPTION OF THE INVENTION

Figure 1:
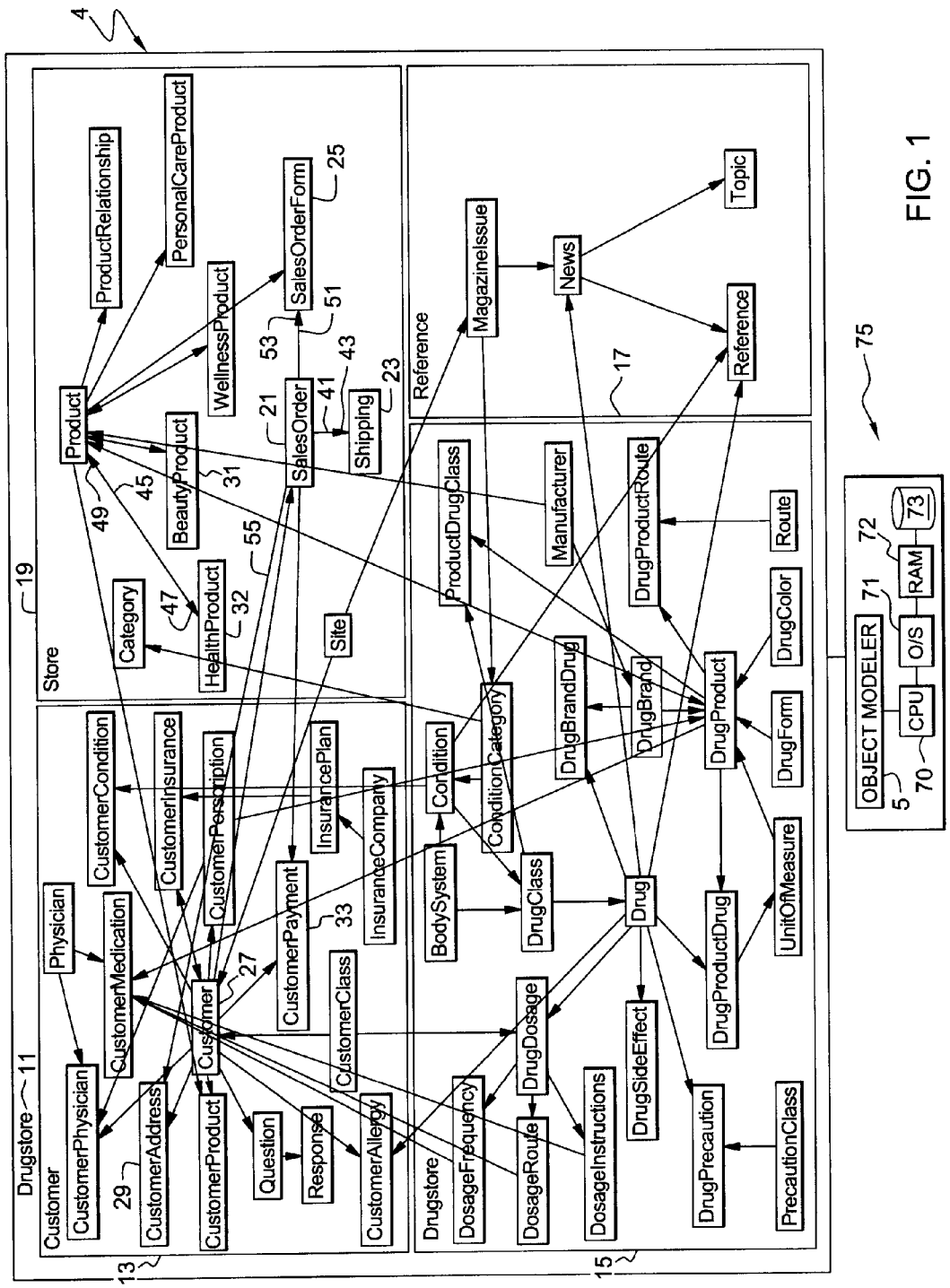
FIG. 1 is a screen rendering of an Object Modeler GUI in accordance with the invention.

When executing software on a computer, a Business Object is a data object, for which storage space on an electronic medium 73 has been allocated, derived from a Business Class template. By template, it is meant that a Business Class defines the generic definition of a Business Object. A data object is an entity stored in an electronic format that is comprised of information. A Business object is, therefore, a dynamically allocated instance of the static Business Class. A Business Class is comprised of attributes, methods, external messages and web documents. Detailed examples of attributes, methods, external messages and web documents are provided below. The Business Processes, comprising in part the Business Class, are themselves comprised of Business Rules, methods, and subprocesses. Business Rules and Business Processes are defined more specifically below. An advantage of the present invention is the ability to model all business activities as interactions between Business Classes.

The structure and organization of the Business Class is such as to uniquely and completely define the attributes of the Business Class. Because the Business Class, when implemented in computer code will often take the form of an OOP class definition, the structure of Business Classes as herein defined bears superficial resemblance to OOP classes. OOP class definitions form the core of various OOP languages including, but not limited to, C++. However, in accordance with the present invention, Business Classes are not limited to implementations in OOP languages, rather, Business Classes may be implemented in non-OOP languages including, but not limited to, JAVASCRIPT. Business Class information and definitions are stored in a repository in a neutral format from which code can be generated in any required computer language.

A subset of characteristics unique to a specific Business Class is the relationship between the specific Business Class and a plurality of other Business Classes with which the specific Business Class interacts. Other characteristics of the specific Business Class may include attributes, specific to the Business Class, which are not dependent upon a relationship with other Business Classes.

Described herein are several methodologies involving graphical user interfaces (GUI) which, taken together, allow a user to diagram at a high level a plurality of Business Classes, the relationships between Business Classes, and subcomponents of Business Classes including, but not limited to, Business Processes and Business Rules. While the following detailed descriptions of the methods by which GUIs may be utilized to perform such diagramming are presented with reference to specific examples, the present invention is not limited to such examples. Rather, the GUI interfaces described herein are intended to broadly encompass any and all graphical means by which a user may interface with a computer, or other electronic device, for the purpose of accomplishing the intended task so described.

As used herein, the term "repository" refers to any aggregation of information whereon data is stored in an electronic format and may retrieved therefrom. As used herein, "electronic format" refers to any mode of storing or manipulating data in digital form. As used herein, "neutral format" refers to a data format which is capable of being expressed in or converted to at least one other computer language including, but not limited to, object oriented computer languages.

With reference to FIG. 1, there is illustrated a graphical representation of a plurality of Business Classes, their organization, and relationships existing between them. FIG. 1 comprises a Graphical User Interface (GUI) 4 implemented in an Object Modeler 5, through which a user may model any business or process and the attendant operation thereof. Business Classes are grouped to form Subjects. Subjects are combined to form Packages. A Package is utilized to construct a Data Repository on an electronic storage medium. In the present example there is illustrated drugstore 11. Drugstore 11 is a Package comprised of Subjects customer 13, drugstore 15, store 19, reference 17. Each Subject is further comprised of a plurality of Business Classes. A Subject represents a logical grouping of Business Classes.

With continued reference to FIG. 1, store 19 is comprised of a plurality of Business Classes such as Product 30, BeautyProduct 31, HealthProduct 32, SalesOrder 21, Shipping 23, and SalesOrderItem 25. Subject Customer 13 is comprised of, Customer 27, and CustomerAddress 29. Using the GUI interface in a point-and-click manner, a user may define and thereby create Business Classes, drag them on a display device to a desired location, and define the logical relationship between the created Business Class and the other Business Classes. Once created and physically located at a desired point on the display device, the user may define the relationships existing between the Business Class and other Business Classes in a GUI supported manner. For example, SalesOrder 21 was created and placed within store 19. A number of lines either eminating from or terminating at SalesOrder 21, with arrowheads located at least one end of such each line's terminus, designates a relationship between SalesOrder 21 and a plurality of other Business Classes. Specifically, SalesOrder 21 can be seen to exist in relationships with SalesOrderItem 25, Shipping 23, Customer Payment 33, Customer 27, and CustomerAddress 29.

One method by which Business Classes and relationships are defined and manipulated through the use of a GUI involves selecting a Business Class object from an object palette, dragging a representation of the Business Class object to a desired location on the user's desktop, and dropping the Business Class object at the location. A palette is a collection of icons from which a user may select a desired icon. Similarly, a relationship might be selected from a relationship palette and applied to a Business Class relationship indicated by a line connecting two Business Classes. The present invention is not limited to any one methodology but is intended to broadly encompass the process of using a GUI to diagram Business Classes and their relationships on a user's desktop. A user's desktop 75 includes, but is not limited to, a CPU 70 and the portion of a viewing monitor within which an operating system 71 displays graphical information to a user.

As is indicated by the format of each line and the arrowheads attached thereto, the aforementioned relationships differ in substance from one another. While any method by which the nature of the lines is visually distinguishable by a user, in the present example lines are presented as either solid or dashed with the arrowheads affixed to at least one terminus of each line represented as either solid or unfilled.

A solid line indicates a relationship while a dashed line indicates ownership. A solid arrowhead indicates the nature of the derivation of a relationship while an unfilled arrowhead indicates inheritance. These concepts are described more particularly below.

SalesOrder 21 has a relationship with Shipping 23 as evidenced by solid line 41 and solid arrowhead 43. As each sales order must be shipped, there is seen to be a relationship between the two Business Classes. While indicating a relationship, a solid line provides no further indication of the nature of that relationship. In contrast, dashed line 51 between SalesOrder 21 and SalesOrderItem 25 indicates ownership. The orientation of filled arrowhead 53 terminating at SalesOrderitem 25 indicates that each SalesOrder 21 owns a SalesOrderitem 25. Similarly, each SalesOrder 21 owns a CutomerAddress 29. Note that this relationship exists among Business Classes contained in separate Subjects. SalesOrder 21 is a member of store 19 while CustomerAddress 29 is a member of customer 13. Customer 27 is seen to own SalesOrder 21 via dashed line 55. Therefore, a Business class may own another Business Class as well as be owned by a third Business Class In the present example, Customer 27 owns SalesOrder 21 and SalesOrder 21 owns SalesOrderItem 25. As will be illustrated, an ownership relationship imposes logical implications on software designed and implemented to carry out the tasks modeled in an Object Modeler.

Product 30 is modeled as possessing relationships with a plurality of Business Classes such as BeautyProduct 31 and HealthProduct 32. Unfilled arrowhead 49 at the terminus of solid line 45 connecting HealthProduct 32 and Product 30 indicate inheritance. The location of unfilled arrowhead at Product 30 indicates that Business Class HealthProduct 32 is inherited from, and is thus the child of, parent Business Class Product 30. As such, Product 30 has been defined to be a template for products. The representation of HealthProduct 32 and BeautyProduct 31 as children of Product 30 indicates that HealthProduct 32 and BeautyProduct 31 are specific instances of the more generalized Business Class 30. As such, HealthProduct 32 and BeautyProduct 31 inherit all of the attributes of Product 30. While the user will likely add additional attributes to HealthProduct 32 and BeautyProduct 31 to reflect the unique characteristics of both, both Business Classes will always contain all of the attributes of the parent Product 30.

Figure 2:
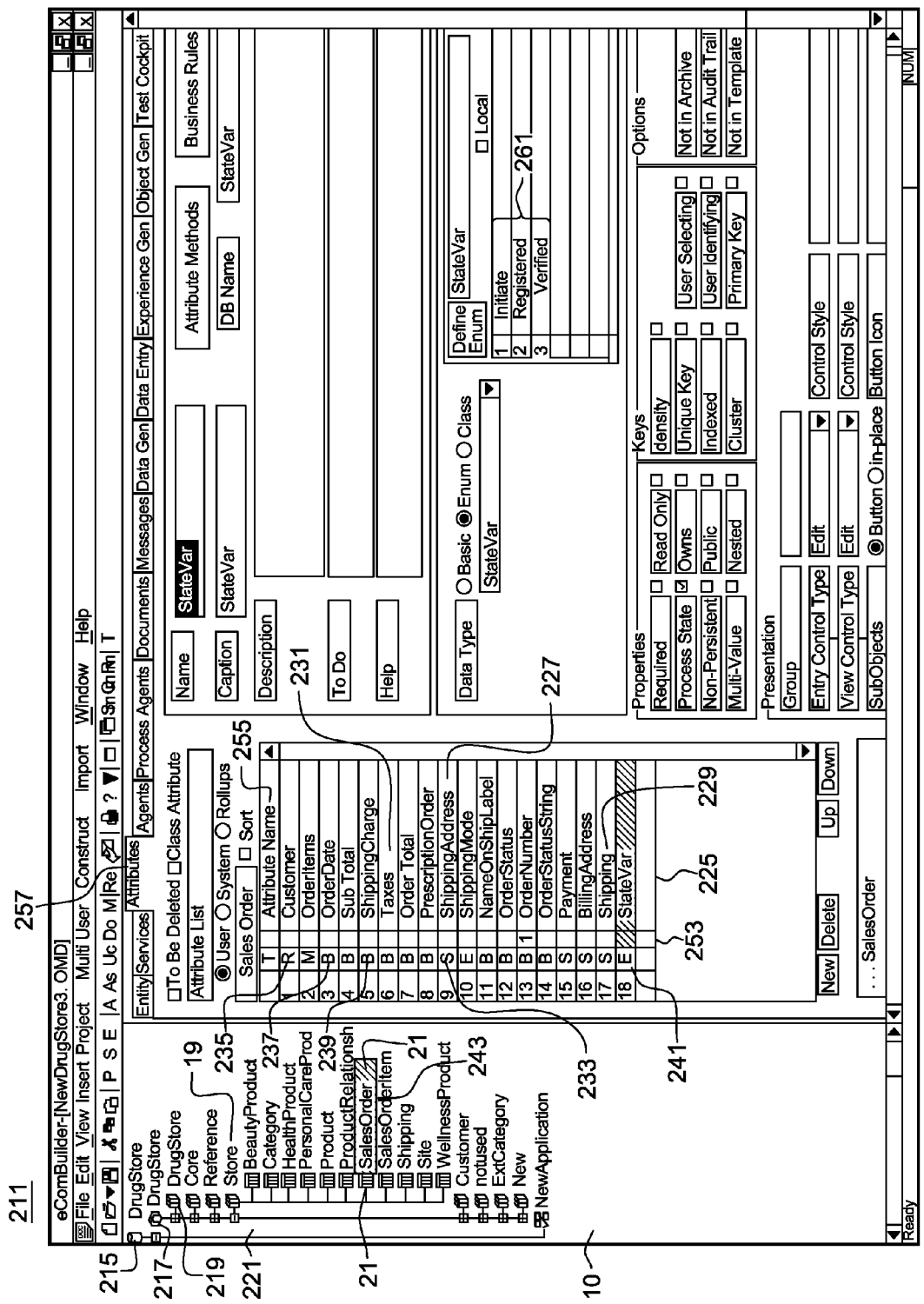
FIG. 2 is a screen rendering of an electronic form based Class Editor GUI for editing the properties of Business Classes.

The visually illustrated attributes of ownership and inheritance impose constraints on the more detailed descriptions of individual Business Classes. The present invention provides a method for translating the visual, GUI created Business Class model, into a repository based aggregation of data elements. Specifically, once defined using the GUI interface, the characteristics of each Business Class so defined are recorded in electronic format on a medium which is either centrally located or which may communicate with other like repositories. With reference to FIG. 2, the present invention comprises an electronic form or text based method for editing the properties of Business Classes. A Class Editor 211 has a class layout portion 210 and an attribute portion 225. Class layout portion 210 is comprised of a plurality of icons arranged so as to illustrate logical groupings of Business Classes. In the present example, repository icon 215 indicates a repository containing all data defining the operation of a drugstore. The drugstore repository of the present example is comprised of a single drugstore Package as indicated by package icon 217. A Package is comprised of one or more subjects. The drugstore Package is comprised of a plurality of Subjects each designated by a subject icon 219. Subject store 19 is illustrated as compromising a plurality of Business Classes. In the present example, SalesOrder 21 is designated as a Business Class by the corresponding business class icon 221. The text "SalesOrder" designating SalesOrder 21 is additionally illustrated as surrounded by a gray rectangle 243. The presence of the gray rectangle 243 is indicative of a user having selected the text through the GUI interface. Such selection may be accomplished through any appropriate means including, but not limited to, single-clicking upon the text.

Class editor 211 is comprised of a series of "tabs" such as attribute tab 251. The tabs serve to logically arrange the plurality of aspects which comprise classes including, but not limited to, subjects, packages, and repositories. With respect to SalesOrder 21, selection by a user of attribute tab 251 causes attribute table 225 to be displayed. Attribute table 225 is comprised of attribute relationship column 253 and attribute name column 255. All of the relationships described above between Business Classes that were defined visually through the GUI by a user are automatically stored in a manner which allows for textual display in attribute table 225. In addition to the information which is derived from the graphical representation of Business Classes illustrated in FIG. 1, the user may enter additional information concerning the attributes of individual Business Classes which are not derived from their relationships with other Business Classes.

Each attribute name listed in attribute name column 255 has an associated value displayed in attribute relationship column 253. Possible values for attribute relationship column 253 include "R", "M", "S", "B", and "E." While the present implementation uses the aforementioned values, any values which may be used that uniquely identify a plurality of attribute relationships. While, in the present example, attribute table 225 includes an entry for each and every Business Class for a which a relationship was defined in FIG. 1, the entry in attribute name column 255 which represents a Business Class possessing a relationship with SalesOrder 21 does not necessarily bear the same name as the Business Class defined in FIG. 1. This follows from the observation that while a single relationship may be established between two entities, the manner in which each entity views the relationship may vary.

For example, consider two persons who are married. There exists a relationship between the two persons. This relationship is optimally a one-to-one relation as each person can be married to no more than one person. The relationship of marriage is the same relationship whether viewed from the perspective of the man or the woman. However, the woman views the person with whom she has a relationship as her husband while the man views the person with whom he has a relationship as his wife. Therefore, if the man is represented as a Business Class, it is preferable to have an entry in attribute table 225 identified as wife. Conversely, the same relationship viewed through the Business Class representing the woman might have an entry for a husband. The present invention provides a method whereby every Business Class can tie a preferred name to a relationship with another Business Class.

Figure 3:
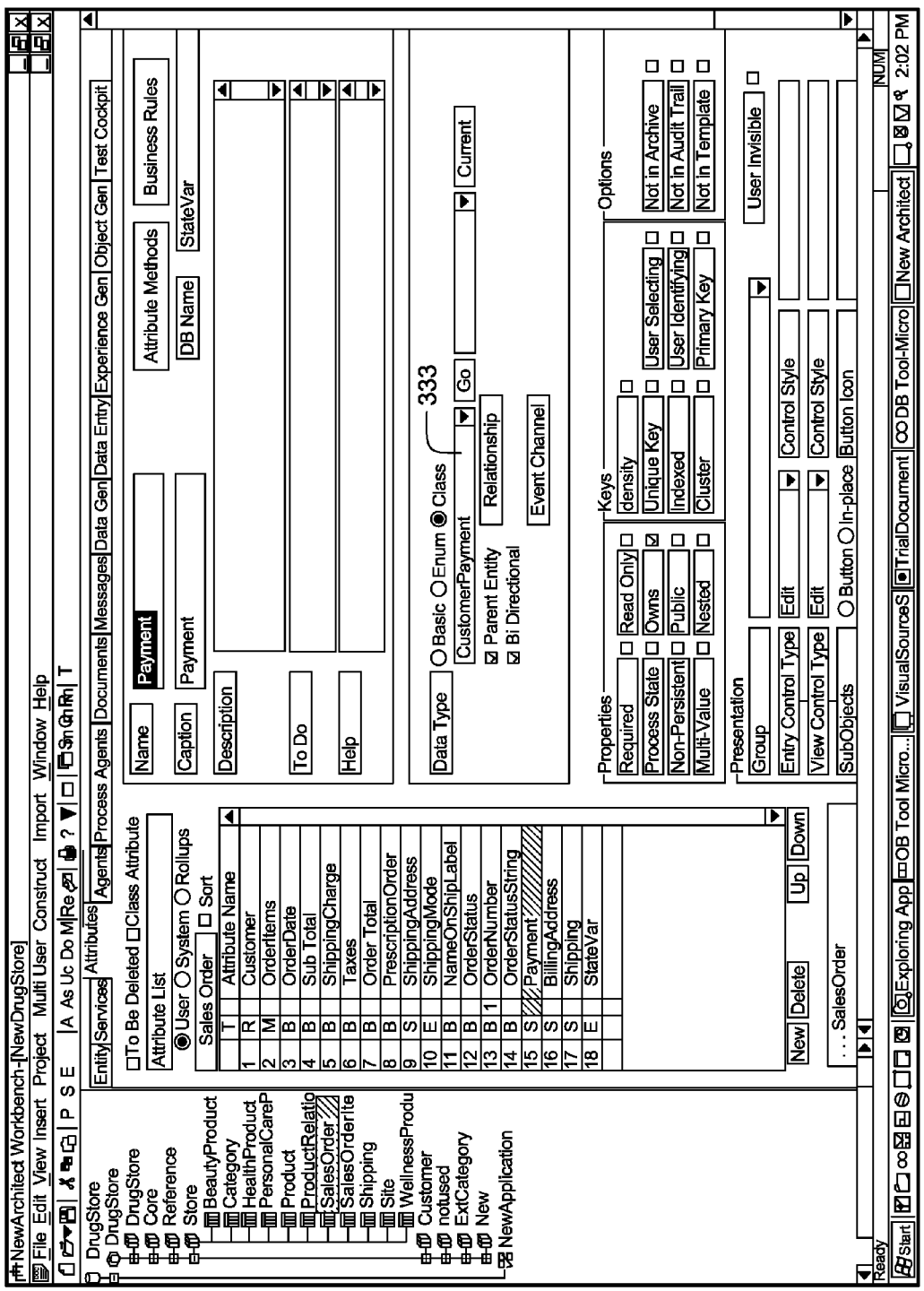
FIG. 3 is a screen rendering of a text-based methodology for displaying attribute data using the Class Editor GUI.

As is illustrated graphically in FIG. 1, each SalesOrder 21 is associated with a CustomerPayment 33. However, attribute name column 255 does not contain an entry for "CustomerPayment." As illustrated in FIG. 3, when the row in attribute name column 225 containing the text "Payment" is selected, the variable name "CustomerPayment" appears in data type entry field 333. Therefore, referring once again to FIG. 2, the "Payment" entry in attribute name column 255 refers to the relationship between SalesOrder 21 and CustomerPayment 33. It will be noted that each entry in attribute name column 255 has an associated entry in attribute relationship column 253. Every relationship between two Business Classes is bidirectional. An entry in the attribute relationship column 253 further defines the nature of the relationship.

An "M" entry indicates a one-to-many relationship. In attribute table 225, the "OrderItems" entry in attribute name column 255 indicates the relationship between SalesOrder 21 and SalesOrderitem 25. Associated with OrderItems is an attribute relationship of "M." This indicates that a single sales order can possess multiple order items.

An "S" attribute indicates a relationship with a Business Class that itself possesses an "R" attribute. Returning to the example of a male class and a female class, the function of the "S" and "R" attributes is apparent. Because each male has one and only one wife, the male class will contain a wife attribute with an "S" relationship attribute. "S" refers to single, as in each male has a single wife. The female class will contain a husband attribute which stands in reference to the wife attribute of the male class. Therefore, the husband attribute of the female class will have an "R" attribute. In addition, there may exist instances where corresponding attributes in separate classes will exhibit an attribute relationship "M" and an attribute relationship "R." In the present example, a male class may have an attribute of daughter with an "M" attribute relationship while the female class will have an attribute of father with an "R" attribute relationship. This results from the fact that a male may have several daughters while each female has one and only one father.

As noted, any number of attribute relationships may be recorded and the present invention is not limited to those described. Rather, any relationship between Business Classes which may be conceived and which serves to define the operation of a Business Class may likewise be captured through the GUI, stored on the repository, and used to generate code and various other data entities related to the Business Class so defined.

Referring to FIG. 2., attribute name "Customer" entered in attribute name column 255 has an associated attribute "R" 235. Attribute name "ShippingAddress" entered in attribute name column 255 has an associated attribute "S" 235. Therefore, SalesOrder 21 relates back to Customer 27 while CustomerAddress relates back to SalesOrder 21.

The attribute "B" refers to a basic data type. A basic data type is usually implemented in computer code as a numeric value including, but not limited to, integers and floating point numbers. In addition, a basic type may be comprised of a byte sequence representing text. The attribute "E" refers to an enumerated data type. Enumerated data types contain integer values with each unique integer value representing a state as illustrated more fully below. Note that in FIG. 2, attribute name "StateVar" entered in attribute name column 255 has an associated attribute "E" 235. The gray area surrounding the text "StateVar" indicates that a user has selected the entry by clicking on the text or though other appropriate means. As a result of the selection, data type information is displayed in data type table 261. There is illustrated enumerated values of "1", "2", and "3" associated with states "Initiate", "Registered", and "Payment Processed" respectively.

Figure 4:
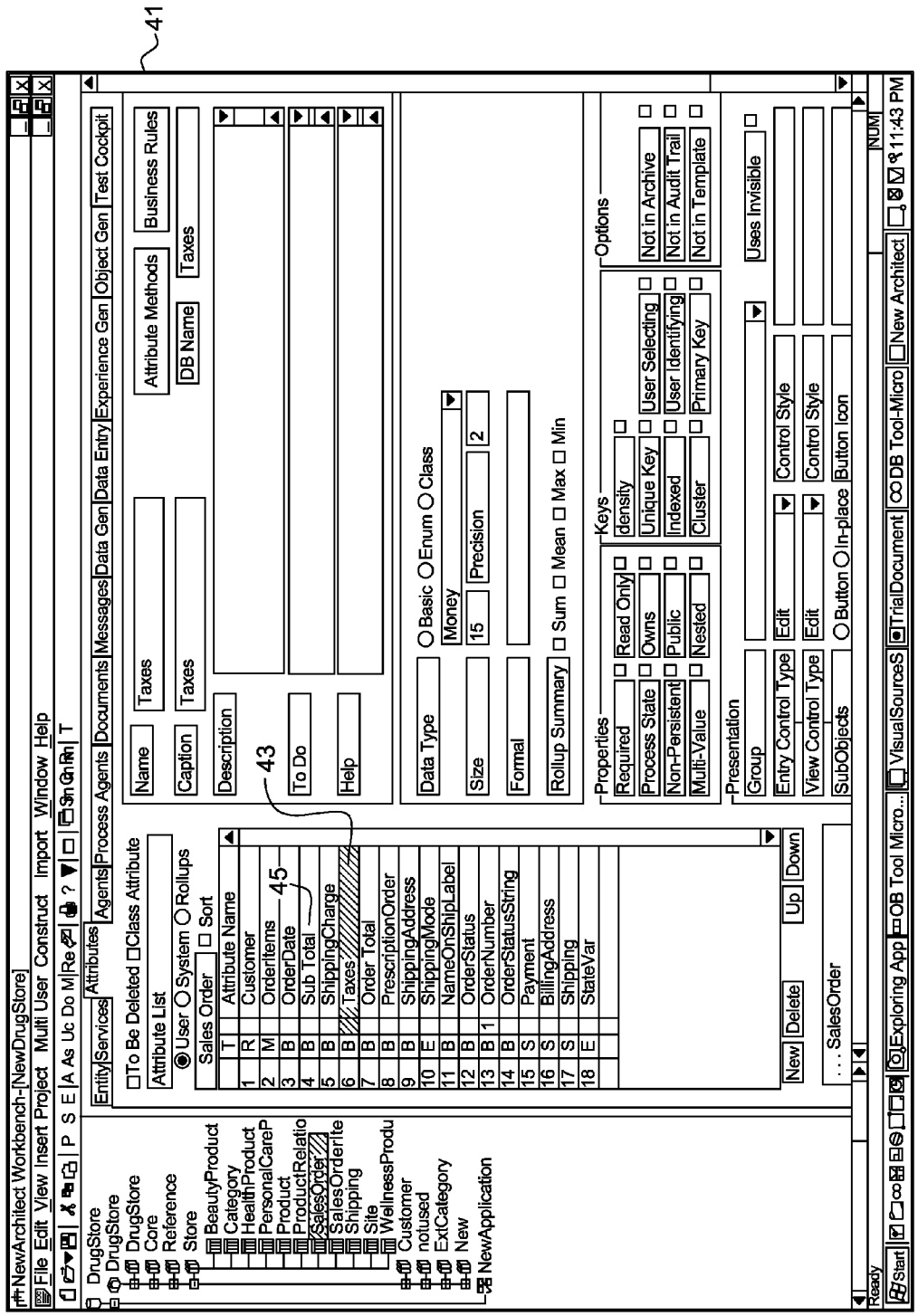
FIG. 4 is a screen rendering of the Class Editor GUI of FIG. 2 illustrating class attributes and their attendant business rules.
Figure 5:
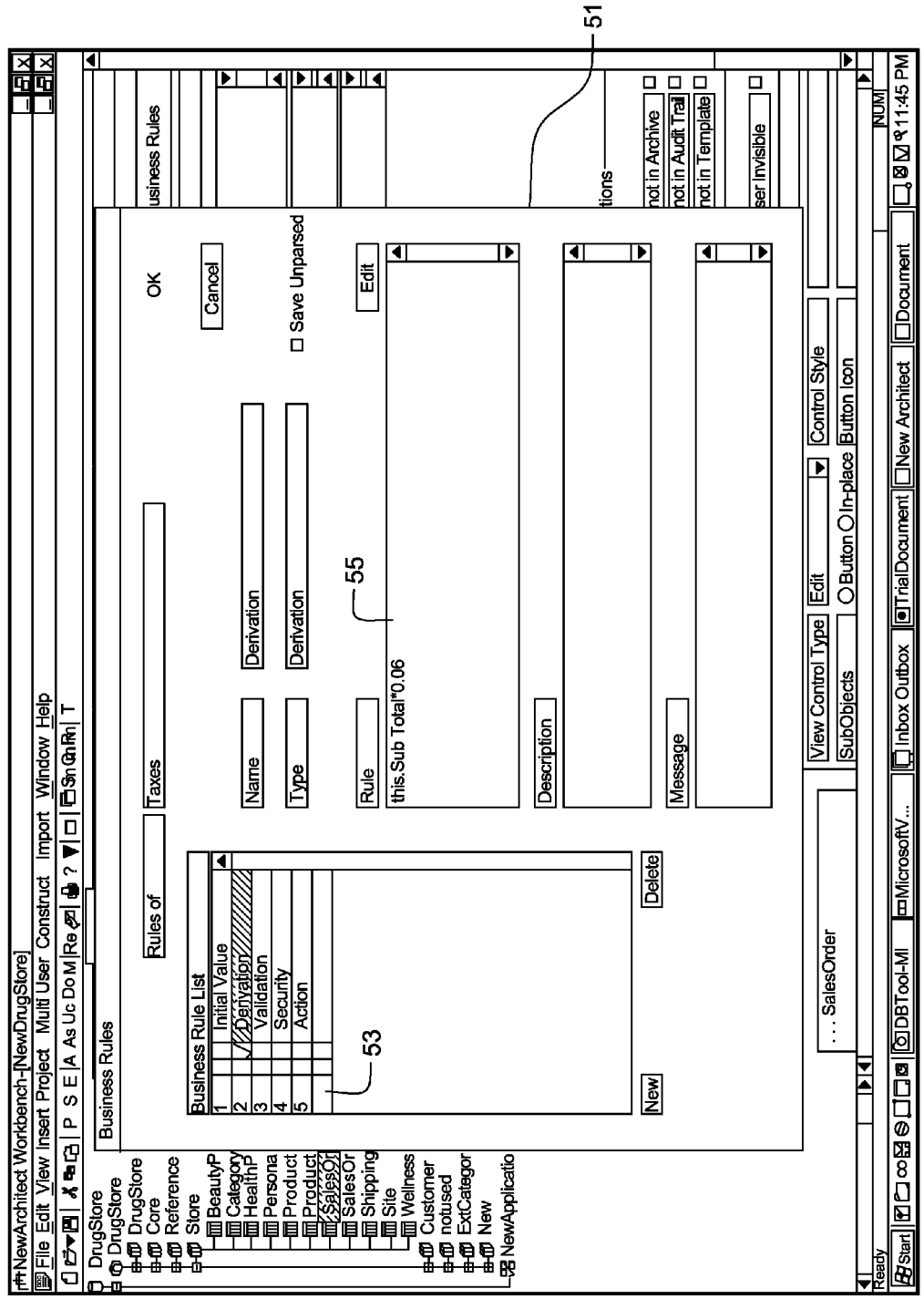
FIG. 5 is a screen rendering of the business rule portion of the Class Editor GUI of FIG. 2.

A basic data type, such as "Taxes", may have one or more associated Business Rules. Business Rules are tied to attributes. With reference to FIG. 4, attribute "Taxes" has been selected and appears highlighted. As a result, Business Rule button 41 is re-plotted with the annotation "(1)." If more than one Business Rule were associated with "Taxes," the annotation appearing in Business Rule button 41 would reflect the number of Business Rules so associated. Clicking on Business Rule button 41 invokes Business Rule window 51 as illustrated in FIG. 5. Business Rule window 51 is comprised of Business Rule table 53 and business rule 55. Business Rule table 53 lists five types of Business Rules including, but not limited to, "Initial Value", "Derivation", and "Validation". An example of an initial value Business Rule would be "this.Quantity=O". An example of a validation Business Rule might consist of the following code:

```
If (this.Quantity > 0)
    return TRUE;
else
    return FALSE;
```

An example of a derivation Business Rule might consist of the following code:

this.Quantity1=this.Quantity2*this.quantity3;

A Business Rule is comprised of logic which contains sufficient structure to enable the generation of computer executable code to perform the defined functionality. An example of such exemplary code is "this.SubTotal*0.06". Business Rules may be tied to an entire Business Class, and hence to all Business Objects derived therefrom, or to an individual instance of a Business Class.

In the present example, business rule 55 is comprised of the following logic: "this.SubTotal*0.06". Because business rule 55 is of type "Derivation," the logic serves to specify how the value of taxes attribute is derived or computed. Using logic descriptors similar to the syntax of C++, business rule 55 states that the value of taxes attribute 43 is to equal the value of attribute subtotal 45 multiplied by 0.06. Attribute subtotal 45 may itself derive its value from a Business Rule which states a dependence on one or more other attributes. As illustrated, all SalesOrder Business objects derived from the Salesorder Business Class will inherit the described taxes business rule 55. However, it is preferable to have a method by which the individual attributes of Business Objects are derived and processed different from one another based upon the unique characteristics of the Business Object. The present invention allows for the incorporation into a Business Rule of logic which is specific to a particular instantiation of a Business Object.

For example, to calculate a separate discount rate for businesses purchasing goods from a particular web site one could code a derivation Business Rule which would return a different discount rate based upon the identity of the buyer. Such a Business Rule might appear as follows:

```
if this.customer = "Joe"
    then this.discount = .06;
else if this.customer = "Fred"
    then this discount = .09;
else if this.customer = "John"
    then this.discount = ".03";
```

In this manner, different customers would receive different discount rates. However, such a methodology relies on hard-coding the identity of customers and their attendant discount rates. Using such a methodology presents challenges when a new customer is added. Specifically, such a methodology requires that the Business Rule within which each separate discount rate is specified contains a hard-coded algorithm for deriving the appropriate discount rate for a given customer. If in the future another customer were added, it would be necessary to re-code the Business Rule to include new discount rate derivation code, regenerate the run time application components of the architecture, and redistribute the new components. Such a process requires considerable new code to be added to an existing architecture requiring potentially laborious testing.

The present invention avoids these drawbacks by allowing a reference in a Business Rule to a row and column in a relational database associated with a defined attribute. While the present invention is illustrated herein with reference to a relational database, the present invention is drawn broadly to the use of any form of memory storage capable of receiving a request for data based upon identifying criteria and returning the data so requested. In this manner, one is able to locate a portion of the logical code comprising a Business Rule outside of the Business Rule definition contained in a Business Class. When such a Business Rule is invoked at run-time, the referenced portion of the Business Rule located externally in the relational database is retrieved and executed. Such execution may consist of interpreting the code or compiling and subsequently executing the code. The result of such a method is the ability to change the functionality of a statically defined Business Rule based upon the identity of a customer or other Business Class attribute.

As has been illustrated, the attributes corresponding to a Business Class fall generally into two groups, those which can be derived from the graphic representation of Business Class relationships as illustrated in FIG. 1, and those which must be manually defined. Regardless of which of the two types into which an individual attribute falls, Business Rules may be defined and tied to the attribute. Regardless of whether a Business Rule accesses the values of other attributes, each Business Rule is tied to one and only one attribute. In contrast to the attribute dependent nature of Business Rules, there exists Business Class level Business Processes which are tied to individual Business Classes. Like Business Classes, however, a portion of the logic required to implement Business Processes may be derived from a graphical representation of the relationship between Business Processes.

Figure 6:
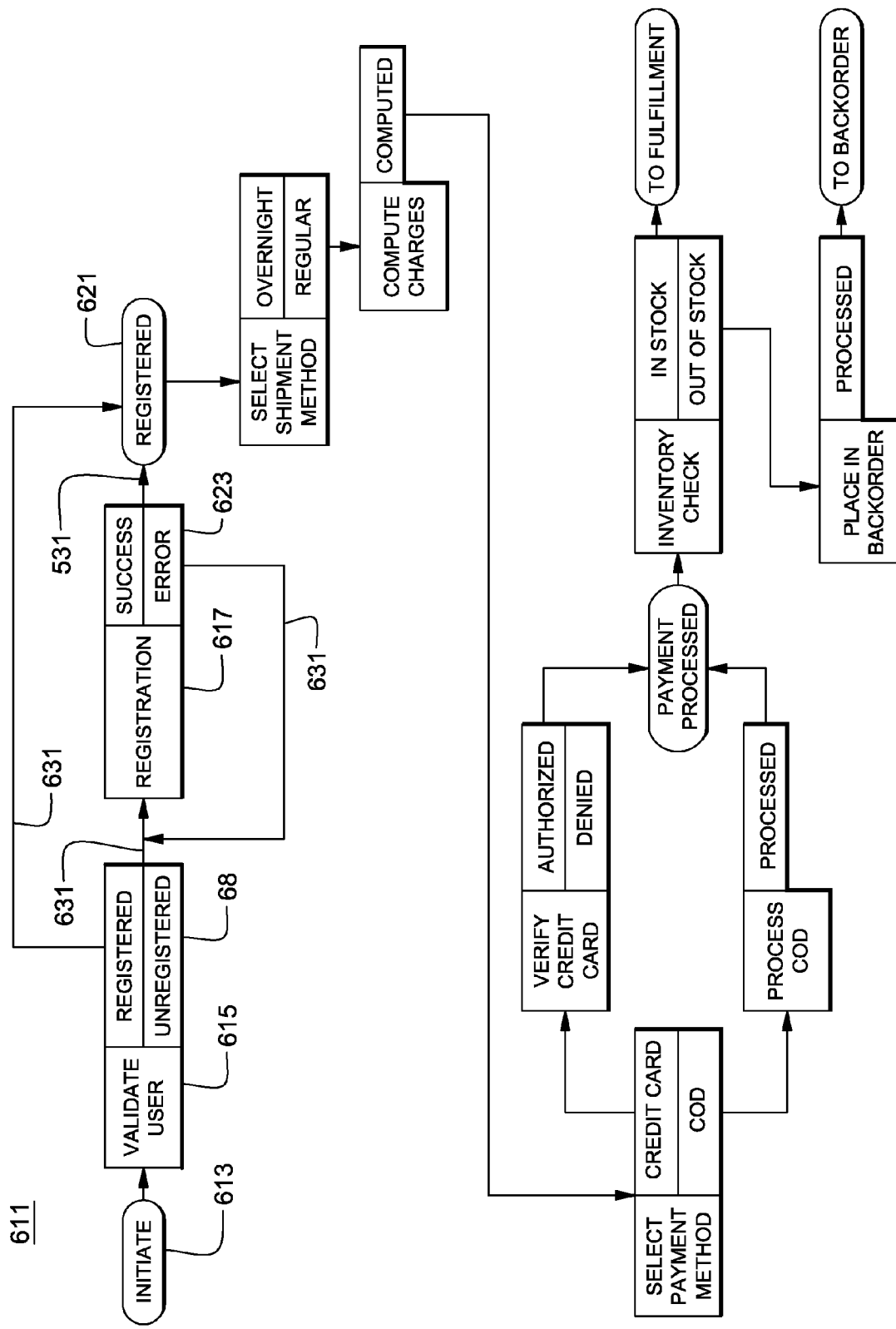
FIG. 6 is a screen rendering of a Business Process Editor GUI.

Business Processes are comprised of states and subprocesses, may be comprised of one or more Business Methods, or may consist of one or more manual processes. A state is the present condition of a Business Class. As detailed with reference to FIG. 2, attribute "StateVar" is an enumerated data type where possible states include "Initiate," "Registered," and "Payment Processed." Subprocesses consist of the logic or operations required to move a Business Class from state to state. FIG. 6 illustrates the GUI interface for the present invention's Business Process Editor 611. Business Process Editor 611 allows the user to define states 613, and 621, Subprocesses 615 and 617, and the states 619, 623 which result from the operation of Subprocesses. Focusing on a portion of the state diagram illustrated in Business Process Editor 611, the user has created elliptical state icons 613 and 621, rectangular Subprocess icons 615 and 617, and rectangular state icons 619 and 623 attached thereto. Such shapes are exemplary and not required. The portion of the Business Process thusly comprised illustrates the initial state of the Business Class SalesOrder shown as initiate state 613, and the Business Methods validate user 615 and registration 617 required to move Business Class SalesOrder to registered state 621.

As is illustrated, the user has created an icon and assigned a textual attribute of "initiate" to form initiate state 613. Next, the user defined two Business Methods in series with initiate state 613 and connected by arrow lines 631. The Business Methods were next assigned the textual attributes of "Validate User" and "Registration" to form validate method 615 and registration method 617. Associated with each method 615, 617 are the states resulting from the operation of the methods. In the present example, the user has defined two possible outcomes for validate method 615: registered or unregistered. Similarly, the user has defined two possible outcomes for registration method 517: success or error. Connected to registration method 617 via arrow line 631 is registered state 621. Each arrow line 631 indicates the direction of logical flow of the Business Process. In the present example a sales order with a state of "initiate" proceeds to validate the user. The diagram of FIG. 5 illustrates that the process of user validation will be accomplished through the implementation of a Business Method identified as validate method 615. Upon completion of performing validate method 615, the state of the user will be either "registered" or "unregistered". If the result is "registered," the logical flow continues, via arrow line 631, directly to registered state 621. If the result is "unregistered," the logical flow continues to registration method 617. Upon completion of performing registration method 617, the state of the registration will be either "success" or "error". If the result is "success," the logical flow continues, via arrow line 631, directly to registered state 621. If the result is "error," the logical flow continues to perform once again registration method 617.

In a manner similar to that illustrated with reference to FIG. 1 and Object Modeler 5, Business Process Editor 611 allows a user, through the utilization of a GUI, to define the logical relationship between entities. While Object Modeler 5 allows the user to define the relationship between Business Classes, Business Process Editor 611 allows the user to define the relationship between Business Class states and Business Methods. In addition, Business Process Editor 611 also allows for the conversion of user defined graphical relationships into detailed, logical abstractions which facilitate the creation of computer code necessary to perform the Business Process so defined.

Figure 7:
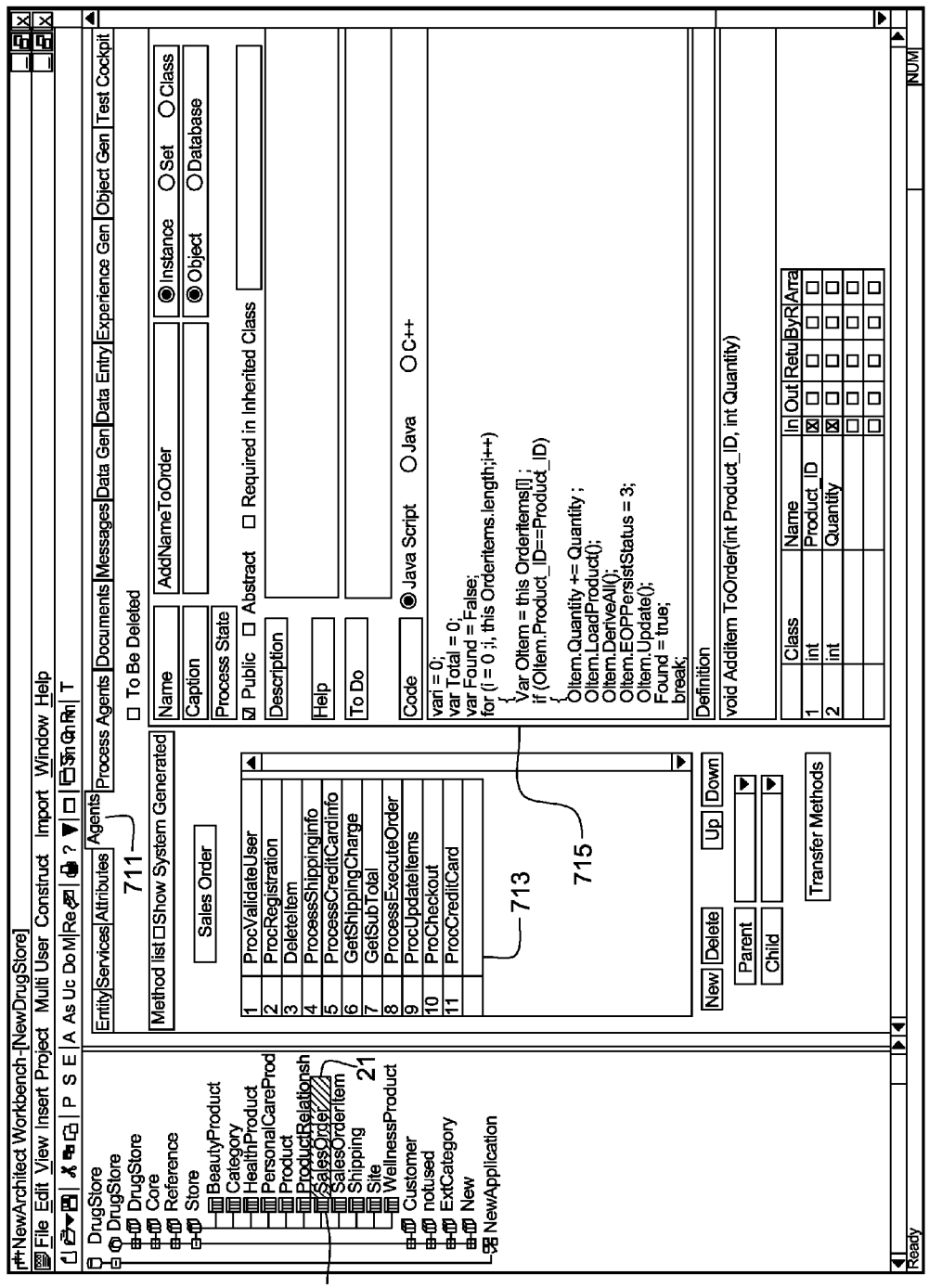
FIG. 7 is a screen rendering of a GUI utilized to display Business Methods.

As described above with reference to FIG. 2, there is illustrated attribute name "StateVar" entered in attribute name column 255 with an associated attribute "E" 235. There is additionally illustrated enumerated values of "1", "2", and "3" associated with states "Initiate", "Registered", and "Payment Processed" respectively. These states were derived from the graphical description of the Business Process illustrated in FIG. 6. With reference to FIG. 7, there is illustrated the GUI utilized by a user to define Business Methods. Note, as with FIG. 2, SalesOrder 21 is selected. Once selected, the user may click, or otherwise select, agents tab 711 to display Business Method information. Selecting agents tab 711 causes Business Method table 713 and Business Method code window 715 to be displayed. Business Method table 713 lists all Business Methods associated with SalesOrder 21. Some of these Business Methods are derived from the relationships specified graphically in Business Process Editor 51.1 and some are user defined Business Methods not derivable from information entered into Business Process editor 511. Still other Business Methods are derived from the Business Class relationships specified in Object Modeler 5 as illustrated in FIG. 1.

With reference to FIG. 7, there is seen Business Method table 713. Business method table 713 is comprised of multiple Business Methods. Among these Business Methods are "ProcValidateUser" and "ProcRegistration." ProcValidateUser and ProcRegistration refer to validate method 615 and registration method 617. As a result of the user defining validate method 61.5 and registration method 617 using Business Process Editor 611, the names of the methods 615, 617 appear in Business Method table 713. The gray rectangle surrounding the text "ProcValidateUser" indicates that the user has selected the first row of the Business Method table 713. As a result of the selection, the code which forms the substance of validate method 615 appears in Business Method code window 715. If code associated with validate method 615 has been previously entered into Business Method code window 715, the code will appear in Business Method code window 715. In addition, code may be added or modified by altering the contents of Business Method code window 715.

In addition to the Business Methods whose names are automatically generated based upon the inputs to the Business Process Editor 611, the present invention can generate both entries and the attendant code for other standard Business Methods. As mentioned, each attribute comprising a Business Class may have a validation Business Rule associated with it. Such a Business Rule provides logic for determining the validity of the attribute to which it is tied. However, Business Rules can only be tied to single attributes. Business Methods, on the other hand, are tied to Business Classes and, as such, may operate on one or more attributes. Because of this property, it is possible to generate a plurality of Business Methods. For example, there can be generated, and the present invention does generate, a Business Method which automatically invokes the validation Business Rules tied to each attribute in order to establish a Business Class validation.

In addition to creating standard attribute validation, the present invention is capable of generating Business Methods to perform Business Class management functions. Such functions manage the allocation of memory comprising the persistent and transient electronic data storage space which define the runtime characteristics of a Business Class. As illustrated in FIG. 1 and discussed above, SalesOrder 21 has a one-to-many relationship with SalesOrderitem 25. That is to say that one SalesOrder 21 may have a plurality of SalesOrderitems 25. While not illustrated herein, it is likewise possible that each SalesOrderItem 25 could have a one-to-many relationship with another Business Class. If, while executing the Business Process comprising the SalesOrder Business Class, it becomes necessary to abort the processing of a sales order, it is preferable to be able to delete all the dependent instances of Business Classes which have been created and are in existence. It is therefore one aspect of the present invention to automatically generate for each Business Class the Business Methods required to handle the deletion of dependent Business Classes and their attendant data.

The present invention allows the user to define each Business Class as being of type "restrict" or type "cascade." If a Business Class is of type "cascade," the run-time embodiment of the Business Class, when no longer valid, will propagate the requirement of deleting dependent Business Classes. As each dependent Business Class may itself comprise further dependent Business Classes, the deletion logic will propagate in tree like fashion from the original Business Class to the last Business Class or Classes dependent thereupon. If, conversely, a Business Class is of type "restrict," the runtime embodiment of the Business Class, when no longer valid, will not proceed to extinguish itself if there are existing Business Classes dependent thereupon.

Figure 8:
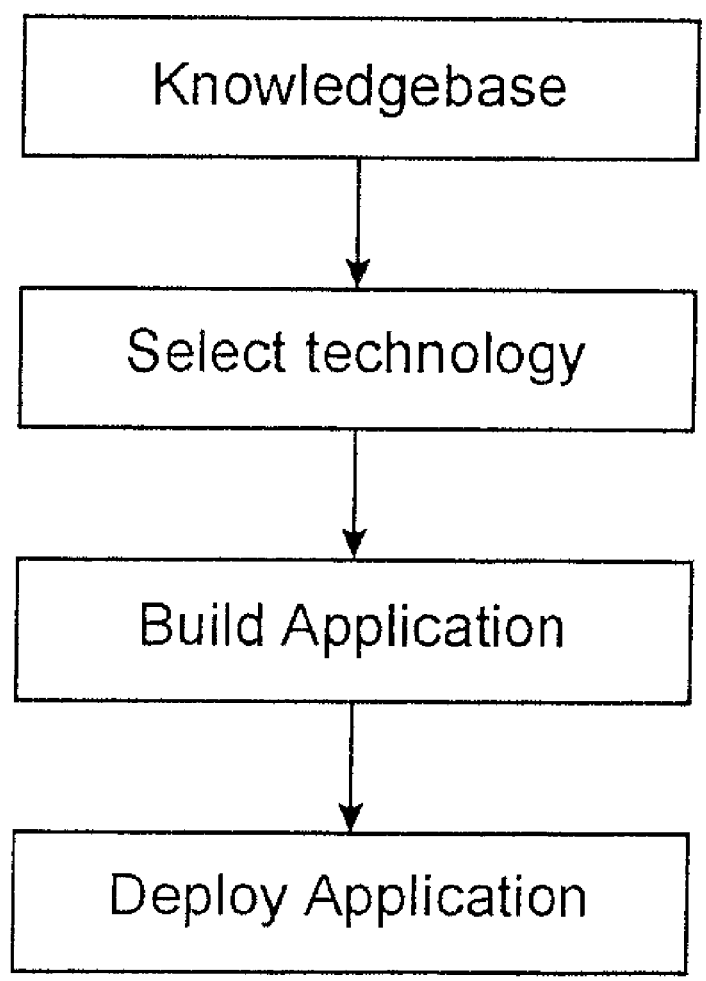
FIG. 8 is a flow chart of the code generation process of the present invention.

The present invention automatically generates Business Methods for each Business Class to allow for the management of Business Class deletions. The generation process flows sequentially from the repository in which are stored the Business Classes comprising an application to the run-time components capable of deployment throughout the architecture on which they are to run. The Business Class definitions residing in the repository form an integrated description of the business model referred to as a knowledge base. Once the knowledge base is created, technology choices, or selections, are inputted to direct the generation of individual run-time components. For example, a user might designate the generation of C++ code and JAVASCRIPT code to be generated for distribution to different platforms. Once the technology is selected, the present invention proceeds to translate the neutral code of the Business Classes into the designated technology specific language thus building the completed runtime application which forms the output of the present invention. In addition, the process of building the application may include the additional step of compiling the generated run-time components to create executable code. After building the application, the generated and executable components are deployed to the platforms upon which they will execute. This process of code generation is graphically depicted in flow chart form with reference to FIG. 8.

The code comprising each such Business Method is generated for inclusion by the user into other Business Methods. The generated code allows for the deletion of both the persistent and the non-persistent, or transient, data which comprises a Business Class. As noted, a Business Class forms the template for a particular run-time Business Object. The Business Object is an instance of the Business Class.

A Business Object, when implemented in computer code forming the run time manifestation of the Business object, comprises persistent and transient representations. For example, there may exist an instance of the SalesOrder Business Class representing an actual run-time sales order. This sales order Business Object, comprising attributes and the attendant functionality required to implement the defined Business Processes and Business Rules, is located in a defined portion of memory in an electronic storage device. This portion of memory may consist of, but is not limited to, the RAM memory 72 of the user's computer 75. This memory space is likely comprised of contiguous memory addresses and may be allocated and deallocated as required by the operating system on the user's computer. While the values stored in the memory space comprised of the structure of the sales order Business Class may change, the amount of memory initially allocated is unlikely to do so. For example, when a derivation Business Rule associated with an attribute of a Business Object is invoked, the resulting value is stored in the corresponding attribute variable of the Business Object. While the value in memory may be changed by such an operation, the amount of memory space is unchanged. If the entire memory space containing the structure of the individual Business Object were de-allocated, as when the Business object is deleted, the Business Object would cease to exist.

However, there is additionally data associated with a Business Object that may persist even after the memory space comprising the Business Object is de-allocated. For example, a SalesOrder Business Object may keep track of the sales items of which it is comprised by storing tabular information in a relational database or other suitable data storage medium. When the transient memory space comprising the Business Object is de-allocated, this tabular data will persist. In many instances, it is the tabular data associated with a Business Object that is most important to delete when the instance of the Business object is no longer required. Therefore, the present invention automatically generates Business Methods to de-allocate the memory storage space comprising the transient Business Class data as well as those necessary to delete the non-persistent data. Examples of the later Business Methods may include, but are not limited to, SQL statements.

In addition to the aforementioned methodologies for entering Business Rules and Business Methods, the present invention provides a methodology for defining and generating web pages in a fashion which is fully integrated with the definition of other Business Class attributes.

Figure 9:
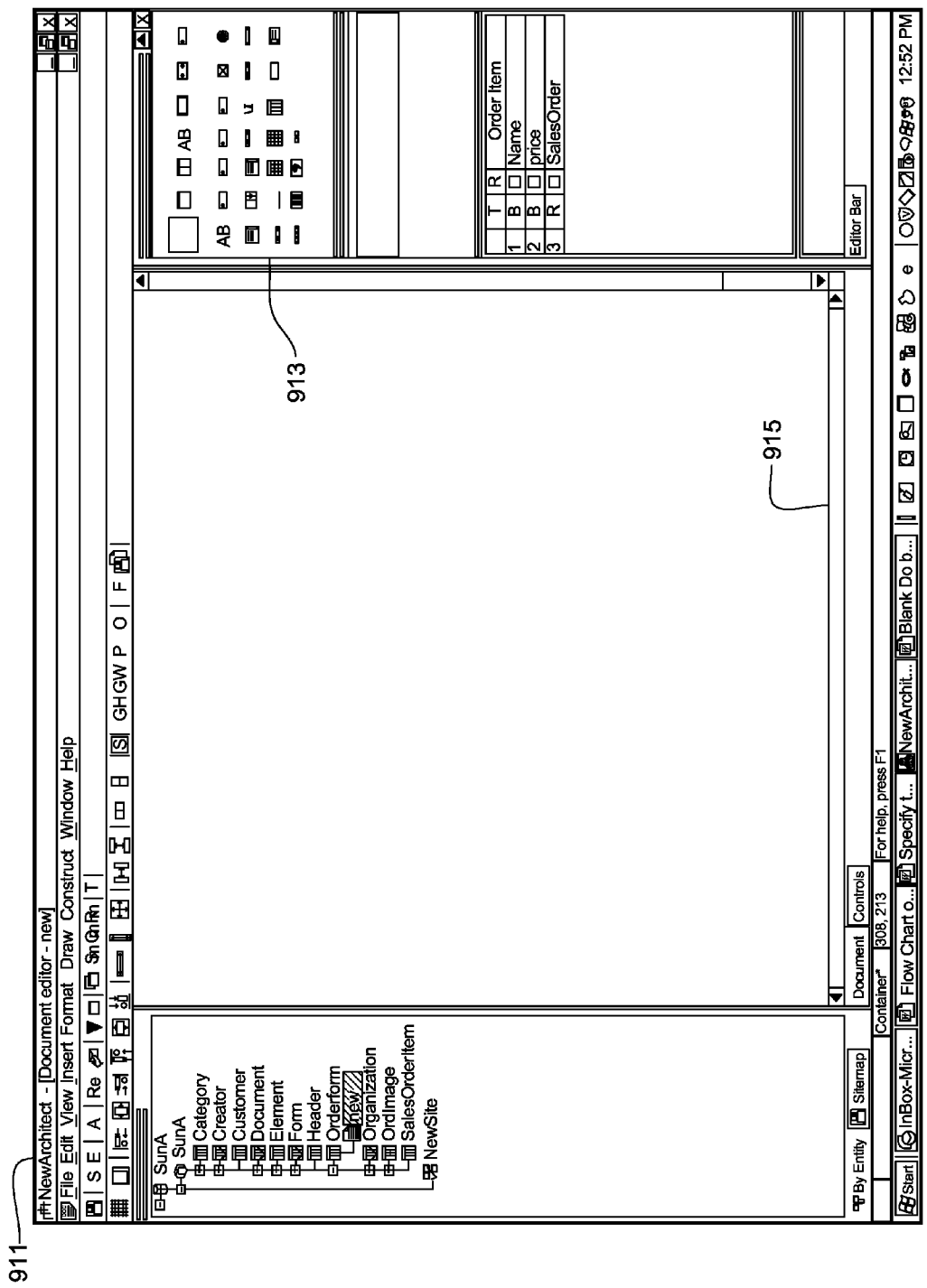
FIG. 9 is a screen rendering of the web page editor of the present invention.

With reference to FIG. 9 there is illustrated the GUI comprising, in part, web page editor 911. Web page editor 911 consists of web page space 915 representing the space upon which graphic and textual elements may be added so as to design a web page. Element selection menu 913 is a collection of icons representing different graphic and textual elements. As shall be more fully illustrated below, elements selected from element selection menu 913 can be selected and placed upon web page space 915 to design and define the layout of a web page.

Figure 10:
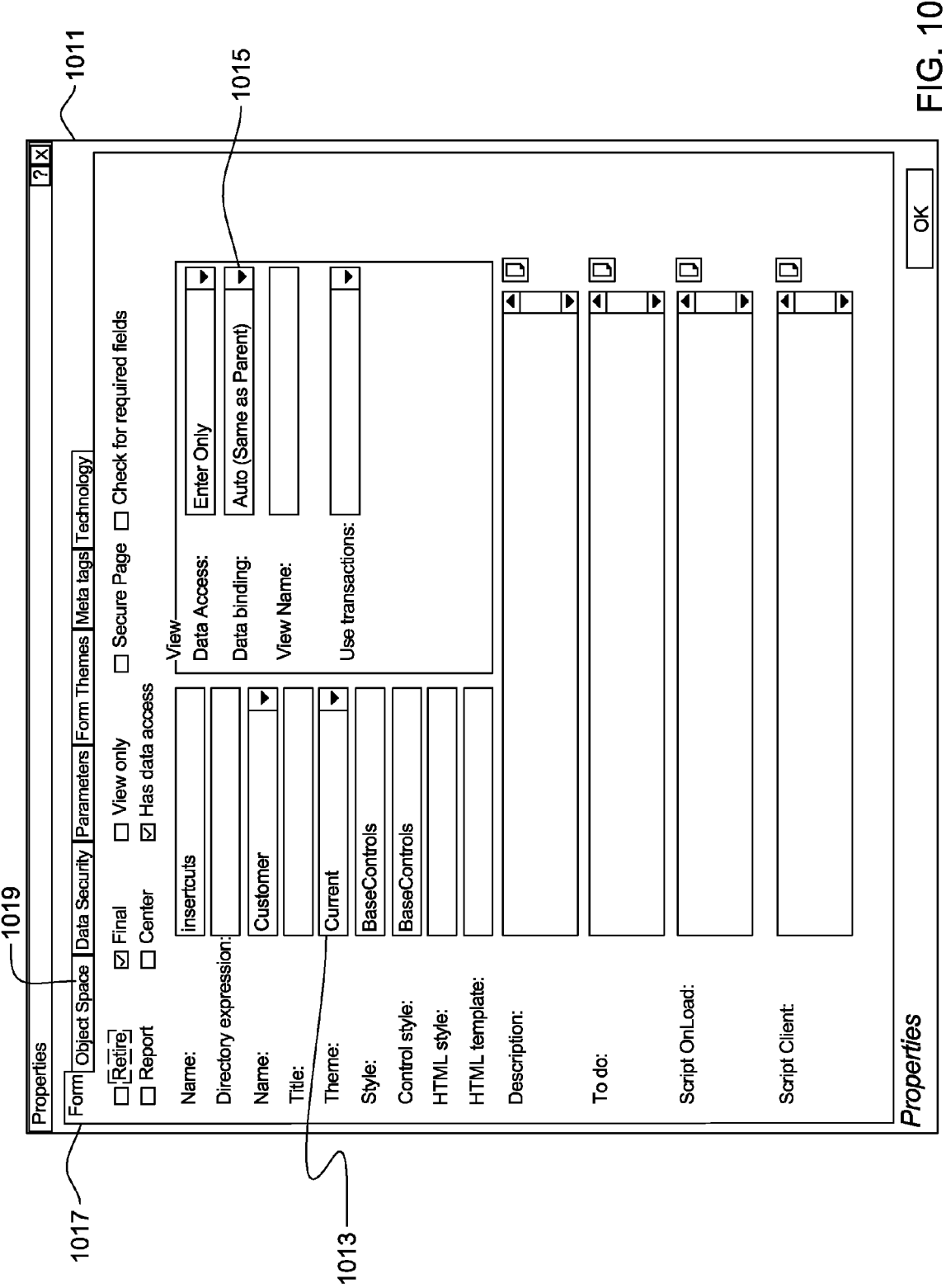
FIG. 10 is a screen rendering of the web page property editor of the present invention showing the form specified attributes.

After entering web page editor 911, the present invention allows definition at the micro and macro levels of the attributes which define the web page as a whole and each graphic or textual element individually. Referring to FIG. 10, there is illustrated web page properties editor 1011. Web page properties editor 1011 may be invoked from the web page editor 911 of FIG. 9 in any of a number of appropriate manners including, but not limited to, clicking on a push button or selecting a tab.

Once web page properties editor 1011 is invoked, there is provided a series of tabs such as form tab 1017 and object space tab 1019. In the present example, form tab 1017 has been selected and as a result a series of entry fields are displayed into which customizing data relating to the web page can be entered. Selecting any of the tabs will invoke a separate window interface through which information about the web page or one of its elements may be entered. A variety of input fields, such as exemplary input field 1013, is included within web page properties editor 1019. In the present instance, there are displayed a plurality of input fields through which there can be defined a plurality of web page attributes including, but not limited to, a web page's name, title, theme, and style. While illustrated herein with a variety of specific input fields, the present invention is drawn broadly to the inclusion of any and all input fields, of any appropriate construct, which allow the definition of web page attributes. Of note is data binding input field 1015 wherein can be entered the mode by which the web page is to be created and accessed.

Figure 10A:
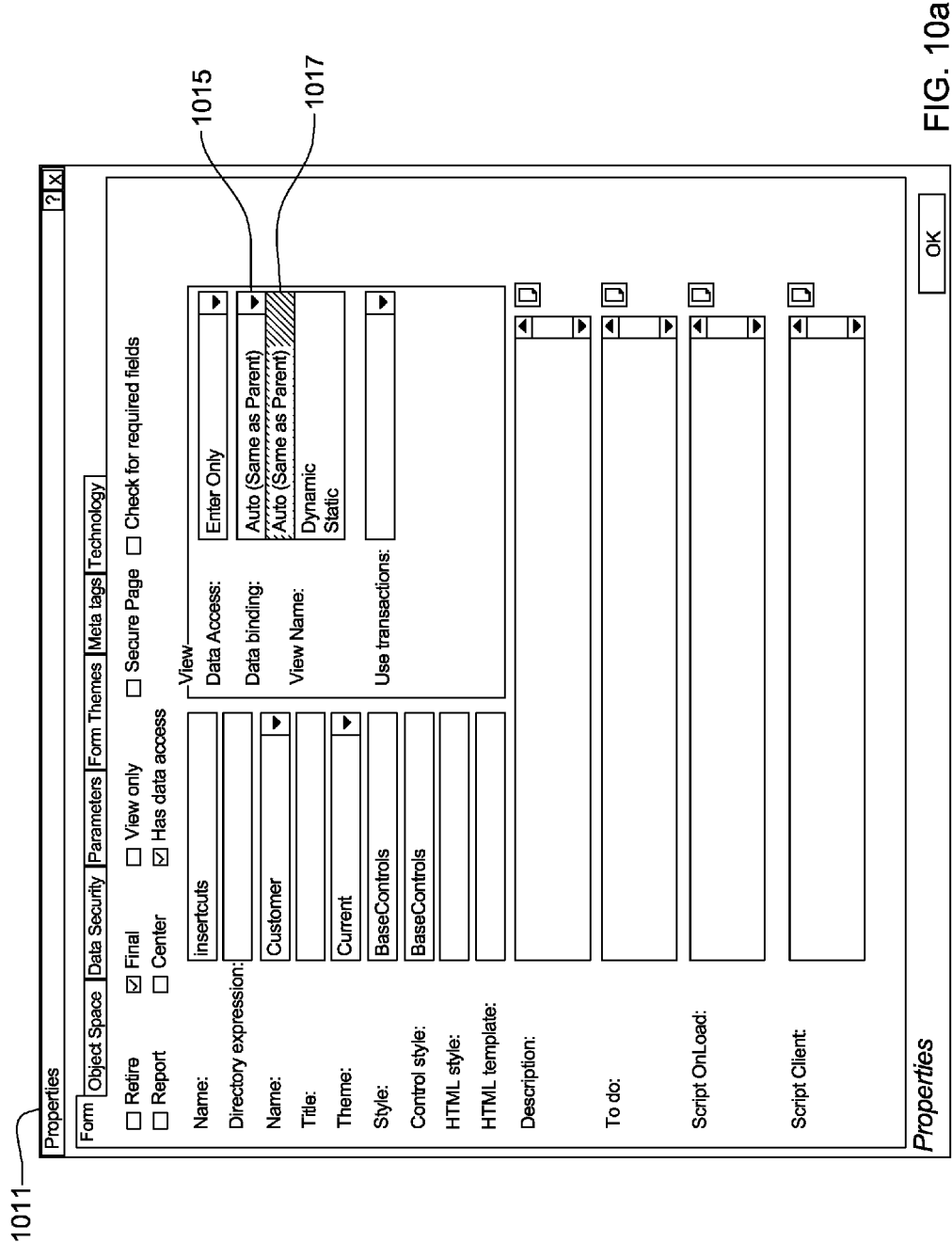
FIG. 10a is a screen rendering of the web page property editor of FIG. 10 illustrating the data binding menu.

With reference to FIG. 10a, there is illustrated data binding input field 1.015 as a drop down list box 1017. Possible selections include "dynamic", "static", and "auto". Selection of static binding will allow the run-time architecture to dynamically update the code comprising the web page at predefined intervals allowing the web page to be stored and accessed as a static web page. Selection of dynamic data binding will provide through the generation of web page code, such as HTML code, of a web page which may be accessed through the run-time architecture. Selection of auto data binding will ensure that the web page is generated according to the same data binding option selected in the Business Class in which the web page resides.

Figure 11:
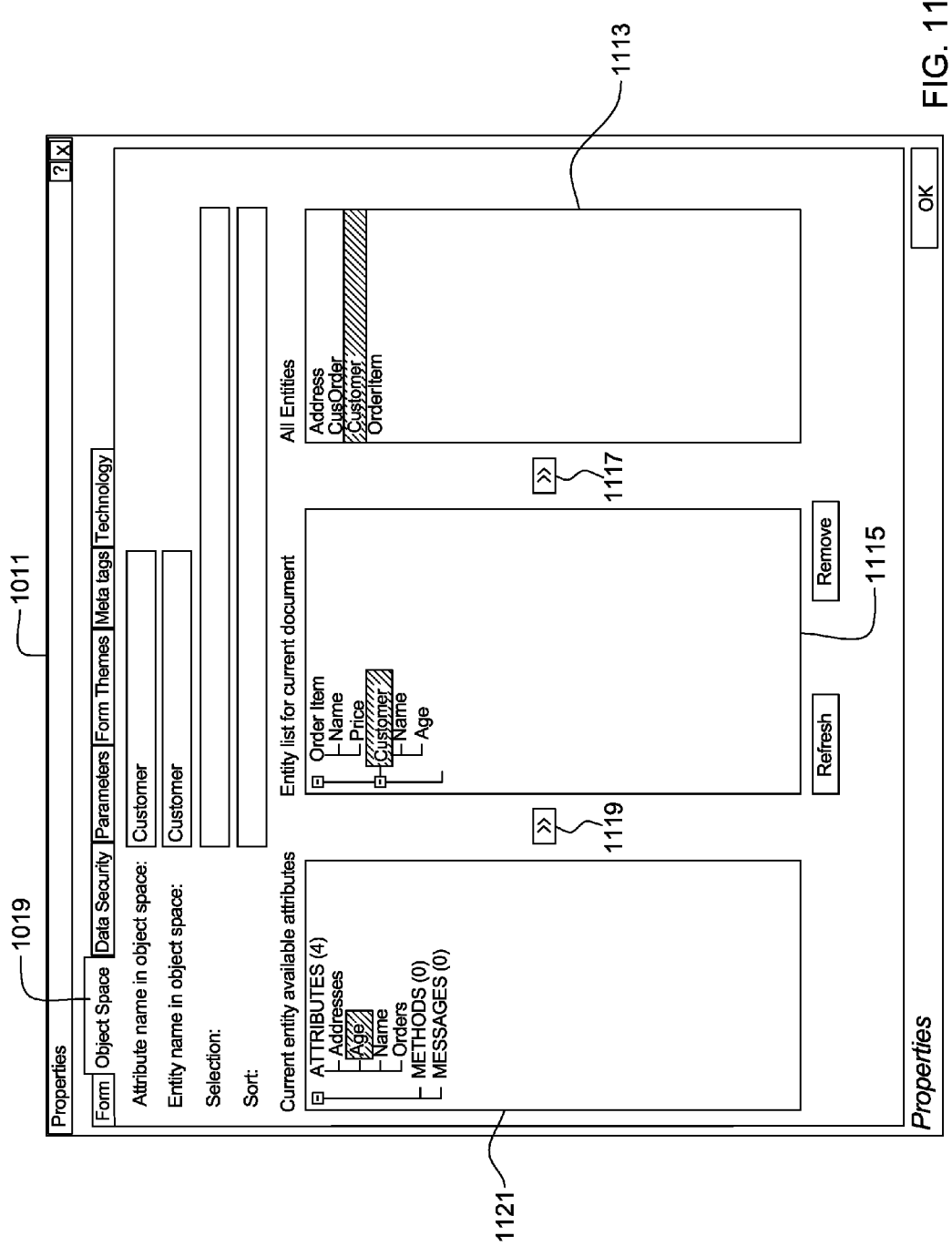
FIG. 11 is a screen rendering of the web page property editor of the present invention showing the object space specified attributes.

The present invention allows for, but does not require, the definition of the object space associated with any web page. As used herein, "object space", refers to the subset of attributes, methods, and rules contained in one or more Business Class definitions which defines the specific functionality required to perform a discreet business function. Use of an object space obviates the difficulties inherent in web based transactions arising from the stateless nature of web based communications. With reference to FIG. 11, there is illustrated web page properties editor 1011 after selection of object space tab 1019. Displayed are entity selection window 1113, available attribute window 1121, current entity window 1115. Data is moved from one window to another through the use of add entity button 1117 and add attribute button 1119. In the present example Business Class customer has been selected and appears highlighted in entity selection window 1.113. Once a Business Class has been selected, clicking on add entity button 1117 causes all of the attribute, methods and messages of the selected Business Class to appear in available attribute window 1121. Once included in available attribute window 1121, selecting an attribute, method, or message followed by clicking on add attribute button 1119 will add the selected attribute to current entity window 1115. Current entity window 115 contains all of the attributes, methods, and messages which comprise the object space associated with the web page. As used herein, a message refers to a sequence of one or more bytes of data which, like a web page definition, has an associated format and object space and may interact with other Business Classes or external code.

Figure 12:
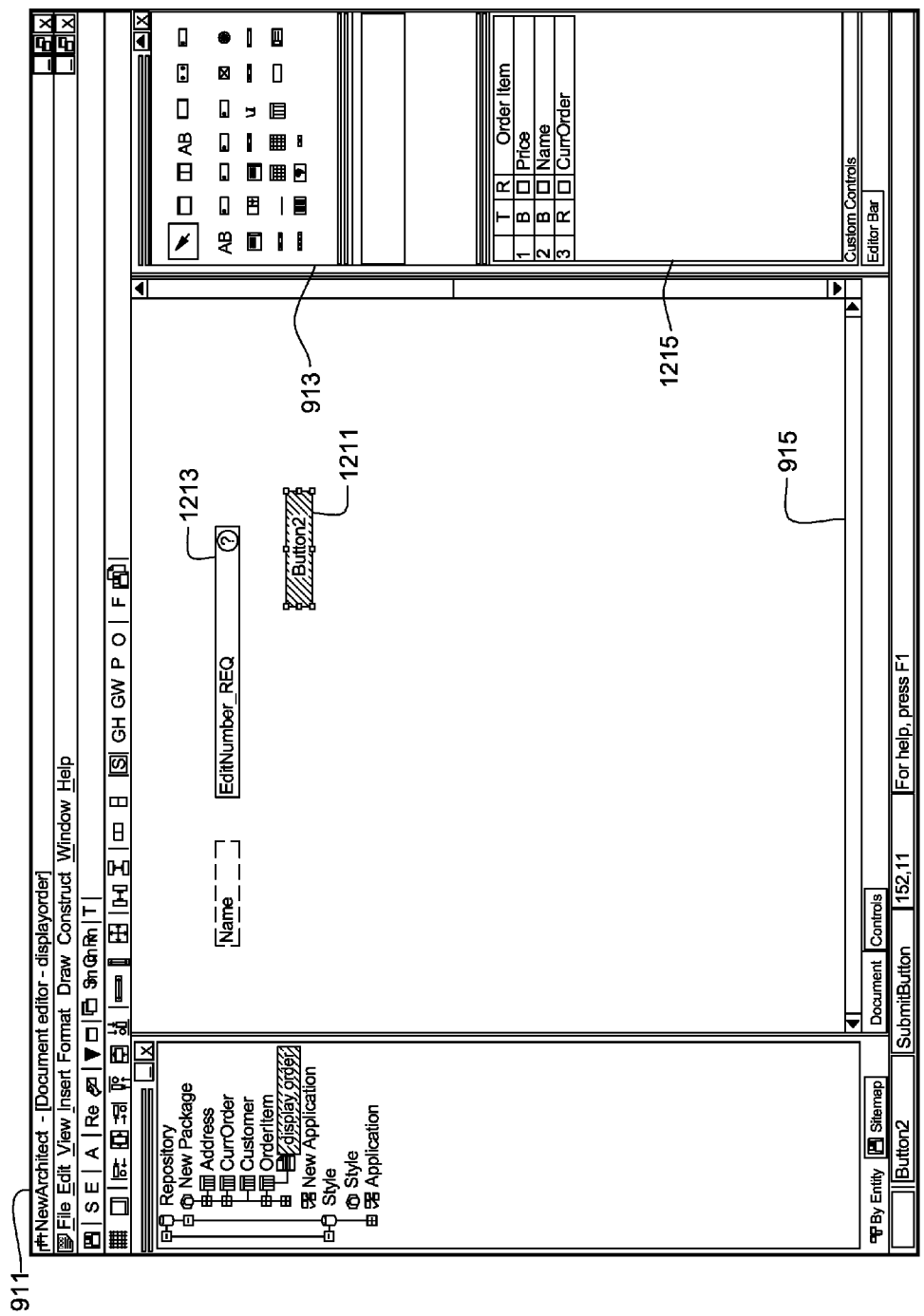
FIG. 12 is a screen rendering of the web page editor of the present invention illustrating the selection and placement of graphical and textual elements.

Whether or not an object space is defined, it is necessary to return to the web page editor 911 of FIG. 9 and to design the web page by placing graphic and textual elements on the web page and associating each element with a Business Class attribute definition. With reference to FIG. 12, there is illustrated web page editor 911 after selection and positioning of exemplary text field 1213 and button 1211 on web page space 915. One method of accomplishing such selection and positioning involves clicking on the icon in element selection menu 913 that corresponds to the element to be placed upon web page space 915 and then clicking on the desired location in web page space 915 where the chosen element is to reside. Once placed in this manner, the element, such as text field 1213 and button 1211, may be selected and moved around web page space 915 as desired in accordance with any of a number of methodologies, including but not limited to, dragging and dropping the element at a new location.

Once graphic and textual elements have been added, their properties must be defined. Note that in the present example attribute window 1215 contains data previously selected when defining the web page's object space. Through any appropriate manner of clicking on a single element in attribute list window 1215 and an element such as text field 1213, definition of a Business Class attribute may be linked to graphic or textual element on web page space 915. In this manner, information contained in a Business Class definition is automatically linked to the web page element. As mentioned, while an object space may be defined for web page before adding elements to the web page space 915, it need not be predefined. In the present example, the specialized attributes which define the operation of a web page element may be entered without reference to an existing Business Class. In the present invention, one may invoke a control properties window to enter data particular to a specific element or control.

Figure 13:
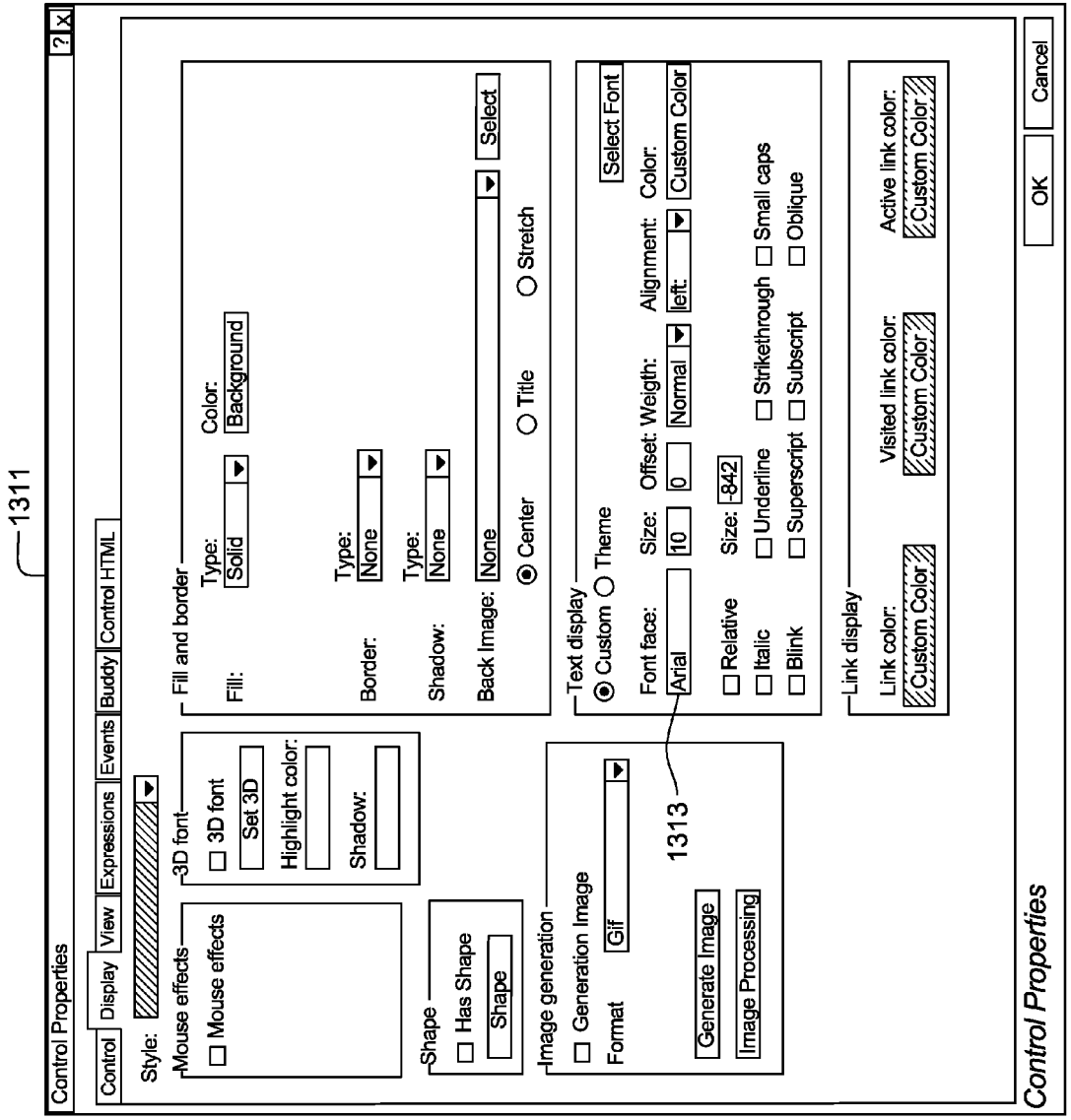
FIG. 13 is a screen rendering of the control property window of the present invention.

With reference to FIG. 13, there is illustrated the control property editor of the present invention. Invoked by the selection of an element placed in web page space 915 of FIG. 9, control property window 1311 allows for the entering of attributes which define the appearance and operation of an element. For example, control property window 1311 is comprised in part of exemplary entry field 1313 into which a font type is entered. The present invention is drawn broadly to any and all assemblages of entry fields or other data entry elements through which the appearance and operation of any and all types of graphic or textual elements may be defined.

Figure 14:
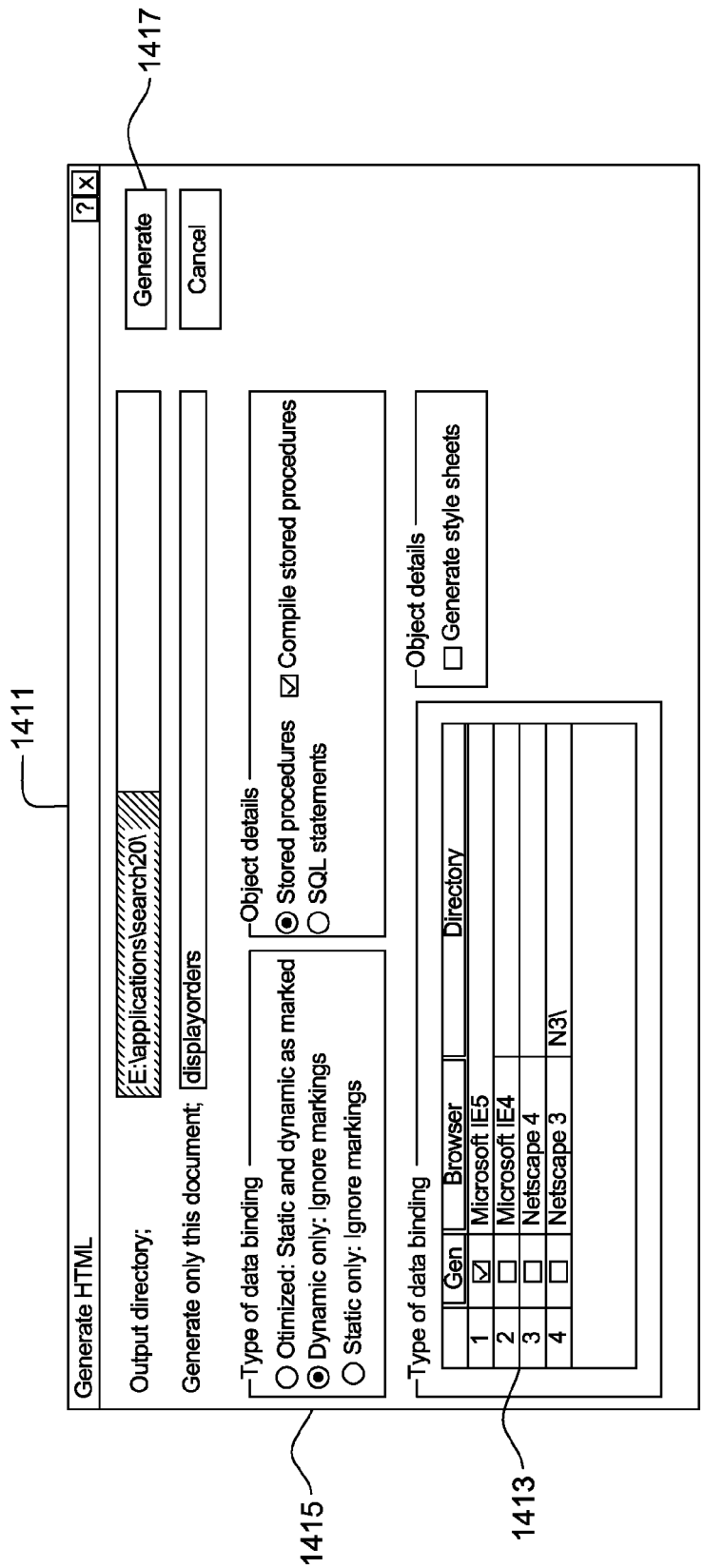
FIG. 14 is a screen rendering of the generate HTML window of the present invention.

Once the attributes of the web page and each element of the web page have been defined, the code for each web page may be generated. With reference to FIG. 14, there is illustrated generate HTML window 1411. While illustrated with reference to generating HTML code, the present invention is drawn broadly to the generation of any and all web based programming languages. Generate HTML window 1411 includes data binding selection 1415 and target browser 1413. Once the method of data binding is selected through the use of data binding selection 1415 and the target browser is selected through the use of target browser 1413, clicking on generate button 1417 will cause the web pages defined by the present invention to be generated into run-time code reflecting the defined appearance and functionality of the web pages so defined.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for forming a workflow and an application program to implement, at least in part, said workflow, said method comprising the steps of:
   recording that a first computer program function is capable of implementing, at least in part, a first business process step;
   recording that a second computer program function is capable of implementing, at least in part, a second business process step;
   a user, with a graphical user interface of a computer system, forming a graphical representation of first and second business processes and an interconnection between said first and second business processes indicating that said first and second business processes are part of a workflow;

said computer system displaying a list including said first and second business process steps as first and second respective instances of said second business process such that only one of said first and second business process steps is needed for said second business process in one instance of said workflow; and based at least in part on said graphical representation, the record of said first computer function being capable of implementing said first business process step and the record of said second computer function being capable of implementing said second business process step, said computer system forming an application program to perform, at least in part, said workflow, said application program including said first and second computer program functions configured such that only one of said first and second business process steps is needed for said second business process in one instance of said workflow, said application program enabling an operator to select either one of said first and second business process steps in said one instance of said workflow, and in response execute the respective one of said first and second computer program functions in said one instance of said workflow.

2. A method as set forth in claim 1 further comprising the subsequent steps of:
an operator selecting said first business process step for said one instance of said workflow, and in response, invoking said first computer program function; and
an operator entering data for an instance of said first business process step, and in response, said first program function processing said data during implementation of said first business process step; and wherein
said one instance of said workflow is successfully completed without processing by said second program function.

3. A method as set forth in claim 1 wherein, in response to said user selecting said first business process step, said computer system displaying said first computer program function, and during said display of said first computer program function said computer system enabling said user to modify said first computer program function for said first business process step such that if said user modifies said first computer program function for said first business process step during said display of said first computer program function, said computer system records that the modified first computer program function is capable of implementing said first business process step.

4. A method as set forth in claim 1 wherein:
a graphical modeling program generates said graphical user interface; and
said application program, after being formed, is operable independently of said graphical modeling program.

5. A method as set forth in claim 1 wherein said first and second business process steps are mutually-exclusive implementations of said second business process such that only one of said first and second business process steps is correctly performed for said second business process in an instance of said workflow.

6. A computer program product for forming a workflow and an application program to implement, at least in part, said workflow, said computer program product comprising:
first program instructions to record that a first computer program function is capable of implementing, at least in part, a first business process step, and record that a second computer program function is capable of implementing, at least in part, a second business process step;

second program instructions to generate a graphical user interface to enable a user to form a graphical representation of first and second business processes and an interconnection between said first and second business processes indicating that said first and second business processes are part of said workflow;

third program instructions to initiate display of a list including said first and second business process steps as first and second respective instances of said second business process such that only one of said first and second business process steps is needed for said second business process in one instance of said workflow;

fourth program instructions, based at least in part on said graphical representation, the record of said first computer function being capable of implementing said first business process step and the record of said second computer function being capable of implementing said second business process step, to form an application program to perform, at least in part, said workflow, said application program including said first and second computer program functions configured such that only one of said first and second business process steps is needed for said second business process in one instance of said workflow, said application program enabling an operator to select either one of said first and second business process steps in said one instance of said workflow, and in response execute the respective one of said first and second computer program functions in said one instance of said workflow; and a computer readable media which stores said first, second, third and fourth program instructions.

7. A computer program product as set forth in claim 6 wherein:
an operator selects said first business process step for said one instance of said workflow, and in response, said first computer program function is invoked;
said operator enters data for an instance of said first business process step, and in response, said first program function processes said data during implementation of said first business process step; and
said one instance of said workflow is successfully completed without processing by said second program function.

8. A computer program product as set forth in claim 6 wherein said fourth program instructions are responsive to said user selecting said first business process step, to display said first computer program function, and during said display of said first computer program function enable said user to modify said first computer program function for said first business process step such that if said user modifies said first computer program function for said first business process step during said display of said first computer program function, said fourth program instructions record that the modified first computer program function is capable of implementing said first business process step.

9. A computer program product as set forth in claim 6 wherein:
said first, second, third and fourth program instructions are part of a graphical modeling and application generating program; and
said application program, after being formed, is operable independently of said graphical modeling and application generating program.

10. A computer program product as set forth in claim 6 wherein said first and second business process steps are mutually-exclusive implementations of said second business process such that only one of said first and second business process steps is correctly performed for said second business process in an instance of said workflow.

11. A computer system for forming a workflow and an application program to implement, at least in part, said workflow, said computer system comprising:
first program instructions to record that a first computer program function is capable of implementing, at least in part, a first business process step, and record that a second computer program function is capable of implementing, at least in part, a second business process step;
second program instructions to generate a graphical user interface to enable a user to form a graphical representation of first and second business processes and an interconnection between said first and second business processes indicating that said first and second business processes are part of said workflow;
third program instructions to initiate display of a list including said first and second business process steps as first and second respective instances of said second business process such that only one of said first and second business process steps is needed for said second business process in one instance of said workflow;
fourth program instructions, based at least in part on said graphical representation, the record of said first computer function being capable of implementing said first business process step and the record of said second computer function being capable of implementing said second business process step, to form an application program to perform, at least in part, said workflow, said application program including said first and second computer program functions configured such that only one of said first and second business process steps is needed for said second business process in one instance of said workflow, said application program enabling an operator to select either one of said first and second business process steps in said one instance of said workflow, and in response execute the respective one of said first and second computer program functions in said one instance of said workflow;
a computer readable media which stores said first, second, third and fourth program instructions; and
a central processing unit to execute said first, second, third and fourth program instructions.

12. A computer system as set forth in claim 11 wherein:
an operator selects said first business process step for said one instance of said workflow, and in response, said first computer program function is invoked;
said operator enters data for an instance of said first business process step, and in response, said first program function processes said data during implementation of said first business process step; and
said one instance of said workflow is successfully completed without processing by said second program function.

13. A computer system as set forth in claim 11 wherein said fourth program instructions are responsive to said user selecting said first business process step, to display said first computer program function, and during said display of said first computer program function enable said user to modify said first computer program function for said first business process step such that if said user modifies said first computer program function for said first business process step during said display of said first computer program function, said fourth program instructions record that the modified first computer program function is capable of implementing said first business process step.

14. A computer system as set forth in claim 11 wherein:
said first, second, third and fourth program instructions are part of a graphical modeling and application generating program; and
said application program, after being formed, is operable independently of said graphical modeling and application generating program.

15. A computer system as set forth in claim 11 wherein said first and second business process steps are mutually-exclusive implementations of said second business process such that only one of said first and second business process steps is correctly performed for said second business process in an instance of said workflow.

16. A method for forming a workflow and an application program to implement, at least in part, said workflow, said method comprising the steps of:
recording that a first computer program function is capable of implementing, at least in part, a first business process step;
recording that a second computer program function is capable of implementing, at least in part, a second business process step;
a user, with a graphical user interface of a computer system, forming a graphical representation of first and second business processes and an interconnection between said first and second business processes indicating that said first and second business processes are part of a workflow; and
said computer system displaying a list including said first and second business process steps as first and second respective instances of said second business process and recording that only one of said first and second business process steps is needed for said second business process in one instance of said workflow.

17. A method as set forth in claim 16 further comprising the subsequent steps of:
an operator selecting said first business process step for said one instance of said workflow, and in response, invoking said first computer program function; and
an operator entering data for an instance of said first business process step, and in response, said first program function processing said data during implementation of said first business process step; and wherein
said one instance of said workflow is successfully completed without processing by said second program function.

18. A method as set forth in claim 16 wherein, in response to said user selecting said first business process step, said computer system displaying said first computer program function, and during said display of said first computer program function said computer system enabling said user to modify said first computer program function for said first business process step such that if said user modifies said first computer program function for said first business process step during said display of said first computer program function, said computer system records that the modified first computer program function is capable of implementing said first business process step.

19. A method as set forth in claim 16 wherein said first and second business process steps are mutually-exclusive implementations of said second business process such that only one of said first and second business process steps is correctly performed for said second business process in an instance of said workflow.

20. A computer program product for forming a workflow and an application program to implement, at least in part, said workflow, said computer program product comprising:
- a computer readable storage media;
- first program instructions to record that a first computer program function is capable of implementing, at least in part, a first business process step;
- second program instructions to record that a second computer program function is capable of implementing, at least in part, a second business process step;
- third program instructions to form a graphical user interface of a computer system, and responsive to user input to said graphical user interface, form a graphical representation of first and second business processes and an interconnection between said first and second business processes indicating that said first and second business processes are part of a workflow; and
- fourth program instructions to initiate display of a list including said first and second business process steps as first and second respective instances of said second business process and record that only one of said first and second business process steps is needed for said second business process in one instance of said workflow; and wherein
- said first, second, third and fourth program instructions are stored on said computer readable storage media.

21. A computer program product as set forth in claim 20 further comprising:
- fifth program instructions, responsive to an operator selecting said first business process step for said one instance of said workflow, to invoke said first computer program function; and wherein
- in response to an operator entering data for an instance of said first business process step, said first program function processing said data during implementation of said first business process step; and
- said one instance of said workflow is successfully completed without processing by said second program function; and
- said fifth program instructions are stored on said computer readable storage media.

22. A computer program product as set forth in claim 20 further comprising fifth program instructions, responsive to said user selecting said first business process step, to display said first computer program function, and during said display of said first computer program function said fifth program instructions system enabling said user to modify said first computer program function for said first business process step such that if said user modifies said first computer program function for said first business process step during said display of said first computer program function, said fifth program instructions record that the modified first computer program function is capable of implementing said first business process step; and wherein
- said fifth program instructions are stored on said computer readable storage media.

23. A computer program product as set forth in claim 20 wherein said first and second business process steps are mutually-exclusive implementations of said second business process such that only one of said first and second business process steps is correctly performed for said second business process in an instance of said workflow.

24. A computer system for forming a workflow and an application program to implement, at least in part, said workflow, said computer system comprising:
- first program instructions to record that a first computer program function is capable of implementing, at least in part, a first business process step;
- second program instructions to record that a second computer program function is capable of implementing, at least in part, a second business process step;
- third program instructions to form a graphical user interface of a computer system, and responsive to user input to said graphical user interface, form a graphical representation of first and second business processes and an interconnection between said first and second business processes indicating that said first and second business processes are part of a workflow;
- fourth program instructions to initiate display of a list including said first and second business process steps as first and second respective instances of said second business process and record that only one of said first and second business process steps is needed for said second business process in one instance of said workflow;
- a computer readable storage media which stores said first, second, third and fourth program instructions; and
- a central processing unit to execute said first, second, third and fourth program instructions.

25. A computer system as set forth in claim 24 further comprising:
- fifth program instructions, responsive to an operator selecting said first business process step for said one instance of said workflow, to invoke said first computer program function; and wherein
- in response to an operator entering data for an instance of said first business process step, said first program function processing said data during implementation of said first business process step; and
- said one instance of said workflow is successfully completed without processing by said second program function; and
- said fifth program instructions are stored on said computer readable storage media.

26. A computer program product as set forth in claim 24 further comprising fifth program instructions, responsive to said user selecting said first business process step, to display said first computer program function, and during said display of said first computer program function said fifth program instructions system enabling said user to modify said first computer program function for said first business process step such that if said user modifies said first computer program function for said first business process step during said display of said first computer program function, said fifth program instructions record that the modified first computer program function is capable of implementing said first business process step; and wherein
- said fifth program instructions are stored on said computer readable storage media.

27. A computer program product as set forth in claim 24 wherein said first and second business process steps are mutually-exclusive implementations of said second business process such that only one of said first and second business process steps is correctly performed for said second business process in an instance of said workflow.

* * * * *